(12) United States Patent
Rubin et al.

(10) Patent No.: US 11,521,390 B1
(45) Date of Patent: Dec. 6, 2022

(54) SYSTEMS AND METHODS FOR AUTODIRECTING A REAL-TIME TRANSMISSION

(71) Applicant: LiveLiveLive, Inc., Croton-on-Hudson, NY (US)

(72) Inventors: Samuel Rubin, Croton-on-Hudson, NY (US); Joshua Farbman, Brooklyn, NY (US); Rafael Bastos, Belas (PT); Rui Filipe Borges Varela, Queluz (PT)

(73) Assignee: LiveLiveLive, Inc., Croton-on-Hudson, NY (US)

( * ) Notice: Subject to any disclaimer, the term of this patent is extended or adjusted under 35 U.S.C. 154(b) by 0 days.

(21) Appl. No.: 17/076,924

(22) Filed: Oct. 22, 2020

Related U.S. Application Data

(63) Continuation of application No. 16/399,387, filed on Apr. 30, 2019, now abandoned.
(Continued)

(51) Int. Cl.
*H04N 21/2187* (2011.01)
*G10L 25/78* (2013.01)
(Continued)

(52) U.S. Cl.
CPC ............... *G06V 20/46* (2022.01); *G06T 7/73* (2017.01); *G06V 40/103* (2022.01); *H04L 65/80* (2013.01);
(Continued)

(58) Field of Classification Search
CPC ........... H04N 21/234; H04N 21/23418; H04N 21/4223; H04N 21/4314; H04N 21/4334; H04N 21/854; H04N 5/23293; H04N 5/23218; H04N 5/23219; H04N 13/10; H04N 13/122; H04N 13/243; H04N 13/289; H04N 13/327; H04N 13/366; H04N 13/373; H04N 21/2187; H04N 21/232; H04N 21/233; H04N 21/234345; H04N 21/242; H04N 21/2743; H04N 21/41265; H04N 21/42203; H04N 21/42204; H04N 21/42222; H04N 21/42224; H04N 21/43072; H04N 21/43079; H04N 21/4312; H04N 21/4316; H04N 21/4331;
(Continued)

(56) References Cited

U.S. PATENT DOCUMENTS

| | | |
|---|---|---|
| 2011/0153045 A1 | 6/2011 | Ryckman et al. |
| 2012/0105611 A1 | 5/2012 | Godar |

(Continued)

*Primary Examiner* — Alison Slater
(74) *Attorney, Agent, or Firm* — Butzel Long

(57) ABSTRACT

In some aspects, the described systems and methods provide for a system for processing a stream for real-time transmission. The system comprises a processor in communication with memory. The processor is configured to execute instructions for an autodirection component stored in memory that cause the processor to receive a real-time stream for an artistic performance, detect one or more human persons in the real-time stream, rank the detected one or more human persons in the real-time stream, select, based on the ranking, a subject from the detected one or more human persons, determine a subject framing for the real-time stream based on the selected subject, process the real-time stream to select a portion of each frame in the real-time stream according to the subject framing, wherein the portion of each frame includes at least the subject, and transmit the processed stream in real-time.

38 Claims, 15 Drawing Sheets

Related U.S. Application Data

(60) Provisional application No. 62/664,640, filed on Apr. 30, 2018.

(51) Int. Cl.
*G06V 20/40* (2022.01)
*H04L 65/80* (2022.01)
*G06T 7/73* (2017.01)
*G06V 40/10* (2022.01)

(52) U.S. Cl.
CPC ............ *H04N 21/2187* (2013.01); *G06T 2207/10016* (2013.01); *G06T 2207/30196* (2013.01)

(58) Field of Classification Search
CPC ............ H04N 21/437; H04N 21/4383; H04N 21/4384; H04N 21/4392; H04N 21/44004; H04N 21/44209; H04N 21/4667; H04N 21/47; H04N 21/47202; H04N 21/4755; H04N 21/4788; H04N 21/482; H04N 21/812; H04N 5/23206; H04N 5/232121; H04N 5/23245; H04N 5/232933; H04N 5/232945; H04N 5/23296; H04N 5/23299; H04N 7/141; H04N 7/147; H04N 7/15; G06K 9/00362; G10H 2220/455; G10H 1/00; G10H 1/0058; G10H 1/368; G10H 1/44; G10H 1/46; G10H 2210/305; G10H 2240/325; G10H 7/00; G10L 25/84; G10L 2015/227; G10L 2025/783; G10L 21/0272; G10L 25/87; G10L 25/78; G10L 15/26; G10L 25/57; G06F 3/017; G06V 10/235; G06V 10/25; G06V 20/40; G06V 40/10; G06V 40/161; G06V 40/19; H04H 60/04; H04L 65/60

See application file for complete search history.

(56) References Cited

U.S. PATENT DOCUMENTS

| | | |
|---|---|---|
| 2012/0176495 A1 | 7/2012 | De Mers et al. |
| 2014/0230340 A1 | 8/2014 | Fox |
| 2014/0368734 A1 | 12/2014 | Hoffert et al. |
| 2015/0146078 A1 | 5/2015 | Aarrestad et al. |
| 2015/0147049 A1 | 5/2015 | Eronen et al. |
| 2016/0110453 A1 | 4/2016 | Kim et al. |
| 2017/0134853 A1 | 5/2017 | Beaty et al. |
| 2017/0155831 A1 | 6/2017 | Jang et al. |
| 2018/0308523 A1 | 10/2018 | Silvestri et al. |
| 2019/0215540 A1 | 7/2019 | Nicol et al. |
| 2020/0053395 A1 | 2/2020 | Mukaiyama et al. |

SYSTEMS AND METHODS FOR AUTODIRECTING A REAL-TIME TRANSMISSION

CROSS-REFERENCE TO RELATED APPLICATIONS

This Application is a Continuation of U.S. patent application Ser. No. 16/399,387, filed Apr. 30, 2019, entitled "SYSTEMS AND METHODS FOR AUTODIRECTING A REAL-TIME TRANSMISSION," which is a Non-Provisional of Provisional (35 U.S.C. § 119(e)) of U.S. Provisional Application Ser. No. 62/664,640, filed Apr. 30, 2018, entitled "SYSTEMS AND METHODS FOR AUTODIRECTING A REAL-TIME TRANSMISSION." The entire contents of these applications are incorporated herein by reference in their entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Conventional approaches to producing a live stream of an event require multiple pieces of expensive camera equipment to capture video and/or audio and a production crew to direct the video and/or audio before being streamed or transmitted to an end user. Typically only live events with a major regional, national, or international interest are streamed or transmitted live due to the cost prohibitive nature of the required camera equipment and production crew.

SUMMARY

Conventional approaches to producing a live stream lack a scalable, turn-key mechanism to automatically capture and direct a stream of a live event. Conventional approaches are cost prohibitive for many live events, such as local music concerts and comedy shows, that an end user may be interested in viewing. Moreover, the conventional approaches typically require a production crew to review captured video and/or audio feeds and decide which feed to include in the stream or transmission. Lastly, for live events such as local music concerts and comedy shows, an end user typically relies on receiving a link to the live stream in order to view the live event. The end user does not have access to a centralized location of such available live streams, as they are typically scattered over multiple sources and difficult to find.

In some aspects, the described systems and methods provide for an autodirection system that receives automatically captured live video and/or audio feeds of a live event from permanently or temporarily installed cameras at a venue of the live event. The autodirection system directs and/or edits the live video and/or audio feeds in real time based on one or more metrics. The autodirection system generates a real-time transmission of the event for an end user. In some embodiments, live video feeds from each camera are sent to virtual observers (also referred to as observers) which apply one or more metrics to score each feed. For example, the virtual observers may receive the streams and analyze them based on audio and video metrics. In some embodiments, the scored metrics are input to a decision making engine which decides whether to switch to another feed or maintain the current feed and/or change the zoom on the selected feed. The decision making engine may use one or more machine learning algorithms or a rule-based system or a combination thereof to make decisions.

In some embodiments, the described systems and methods provide for receiving a series of audio and video inputs from a live performance, analyzing the inputs in real-time, and make decisions on how to direct and produce a real-time transmission of a given performance. The decision making engine may use scoring generated by analysis metrics and determine what video stream to use and/or where to crop/zoom in that stream. Once these decisions have been made, a real-time transmission may be rendered for delivery to end-users. In some embodiments, the autodirection system may receive different kinds of data and media sources as inputs. One group of inputs may be audio feeds, including the house mix from a concert venue. The audio feeds may also include individual audio feeds from different performers and/or microphones positioned around the venue. A second group of inputs may be raw, high quality video streams from one or more cameras mounted around the venue. Other types of inputs may include data from spatial tracking systems that transmit the location of specific performers on stage or motion tracking systems that relay information about the audience. The audio/video type inputs may be pulled into the autodirection system via a multiplexing card or piece of stand-alone hardware that receives the streams from the venue's mixing board and cameras and relays them in a format that the autodirection system can understand. Spatial and motion-related inputs may be transmitted to the autodirection system either wirelessly, via direct connection over Ethernet, or another suitable medium.

The described systems and methods are advantageous over conventional approaches because they do not require expensive camera equipment or a production crew to produce the real-time transmission. The direction and/or editing of the feeds of the live event is performed in real time and the end user receives the real-time transmission as soon as it is generated. It is noted that there may be minimal delay due to time taken to generate and transmit the real-time transmission. Moreover, the real-time transmission may omit one or more frames of a portion of an interest as the real-time transmission is generated and transmitted. For example, the system may determine that a "drum solo" has begun in a live music event and switch to a live feed capturing the "drum solo." However, due to the real-time nature of the transmission, a few frames from the beginning of the "drum solo" may not be streamed while the autodirection system makes the switch to the appropriate live feed and generates the real-time transmission.

In some aspects, the described systems and methods provide for a system for selecting a stream for real-time transmission. The system comprises an autodirection component. The autodirection component is adapted to receive one or more real-time streams. The autodirection component is further adapted to synchronize each received stream to a current time. The autodirection component is further adapted to score each received stream with respect to one or more metrics. The autodirection component is further adapted to select, based on the scored metrics, a stream from the one or more real-time streams for real-time transmission. The autodirection component is further adapted to transmit the selected stream in real-time.

In some embodiments, the autodirection component is further adapted to zoom and/or pan, based on the scored metrics, to a portion of the selected stream.

In some embodiments, the autodirection component is further adapted to switch a currently transmitted stream to the selected stream for real-time transmission. In some embodiments, the switching is performed at a slower rate or a faster rate based on the scored metrics.

In some embodiments, the autodirection component is further adapted to convert the one or more real-time streams from a first format to a second format.

In some embodiments, the one or more real-time streams includes a video stream and/or an audio stream.

In some embodiments, at least one of the one or more real-time streams is received from one or more cameras, the one or more cameras including a permanently installed camera, a temporarily installed camera, and/or a mobile phone camera.

In some embodiments, the one or more metrics relates to a video stream and includes motion tracking, vocalist identification, and/or instrumentalist identification.

In some embodiments, the one or more metrics relates to an audio stream and includes voice detection, instrument detection, onset detection, intensity, larm, loudness, beat tracking, and/or danceability.

In some embodiments, a first set of metrics is associated with a first user and a second set of metrics is associated with a second user. Further, a first stream from the one or more real-time streams is selected for real-time transmission to the first user based on the scored first set of metrics. Further, a second stream from the one or more real-time streams is selected for real-time transmission to the second user based on the scored second set of metrics.

In some aspects, the described systems and methods provide for a computer implemented method for selecting a stream for real-time transmission. The method comprises the act of receiving one or more real-time streams. The method further comprises the act of synchronizing each received stream to a current time. The method further comprises the act of scoring each received stream with respect to one or more metrics. The method further comprises the act of selecting, based on the scored metrics, a stream from the one or more real-time streams for real-time transmission. The method further comprises the act of transmitting the selected stream in real-time.

In some embodiments, the method further comprises the act of zooming and/or panning, based on the scored metrics, to a portion of the selected stream.

In some embodiments, the method further comprises the act of switching a currently transmitted stream to the selected stream for real-time transmission. In some embodiments, the switching is performed at a slower rate or a faster rate based on the scored metrics.

In some embodiments, the method further comprises the act of converting the one or more real-time streams from a first format to a second format.

In some embodiments, the one or more real-time streams includes a video stream and/or an audio stream.

In some embodiments, at least one of the one or more real-time streams is received from one or more cameras, the one or more cameras including a permanently installed camera, a temporarily installed camera, and/or a mobile phone camera.

In some embodiments, the one or more metrics relates to a video stream and includes motion tracking, vocalist identification, and/or instrumentalist identification.

In some embodiments, the one or more metrics relates to an audio stream and includes voice detection, instrument detection, onset detection, intensity, larm, loudness, beat tracking, and/or danceability.

In some embodiments, a first set of metrics is associated with a first user and a second set of metrics is associated with a second user. Further, a first stream from the one or more streams is selected for real-time transmission to the first user based on the scored first set of metrics. Further, a second stream from the one or more streams is selected for real-time transmission to the second user based on the scored second set of metrics.

In some aspects, the described systems and methods provide for a system for processing a stream for real-time transmission. The system comprises a processor in communication with memory. The processor is configured to execute instructions for an autodirection component stored in memory that cause the processor to receive a real-time stream for an artistic performance, detect one or more human persons in the real-time stream, rank the detected one or more human persons in the real-time stream, select, based on the ranking, a subject from the detected one or more human persons, determine a subject framing for the real-time stream based on the selected subject, process the real-time stream to select a portion of each frame in the real-time stream according to the subject framing, wherein the portion of each frame includes at least the subject, and transmit the processed stream in real-time.

In some embodiments, the detected one or more human persons are ranked based on proximity to a camera that captures the real-time stream.

In some embodiments, the detected one or more human persons are ranked based on determining which human person is singing in the artistic performance.

In some embodiments, the detected one or more human persons are ranked based on proximity to a center of each frame in the real-time stream.

In some embodiments, determining the subject framing comprises determining that one of the human persons is singing and selecting that human person as the only subject for the portion of each frame.

In some embodiments, determining the subject framing comprises determining that none of the human persons is singing and selecting two or more human persons as the subjects for the portion of each frame, wherein the portion of each frame includes both the subjects.

In some embodiments, the real-time stream is captured from one or more cameras including a left camera, a right camera, and/or a center camera.

In some embodiments, a second real-time stream for the artistic performance is not further analyzed subsequent to detecting no human person in the second real-time stream.

In some embodiments, a second real-time stream for the artistic performance is analyzed using one or more backup rules subsequent to detecting no human person in the second real-time stream.

In some embodiments, processing the real-time stream further includes selecting a zoom level for selecting the portion of each frame of the real-time stream.

In some embodiments, processing the real-time stream further includes selecting a first zoom level for some frames of the real-time stream and a second zoom level for remaining frames of the real-time stream.

In some embodiments, the system determines a penalty based on a quality of the real-time stream.

In some embodiments, the quality of the real-time stream includes whether the subject is trackable, whether the subject is out of frame, and/or whether there is noise in detection of the subject.

In some embodiments, a distance of the subject from a camera capturing the real-time stream is determined based on a size of the head of the subject.

In some embodiments, detecting one or more human persons in the real-time stream includes detecting a human body and/or one or more mandatory parts.

In some embodiments, the one or more mandatory parts include an eye, an elbow, and a shoulder.

In some embodiments, the portion of each frame is selected based on maintaining a minimum margin between the head of the subject and an edge of the portion of the frame.

In some embodiments, a second real-time stream from a different camera is selected based on a threshold time passing subsequent to an initial transmission of the processed stream. In some embodiments, a second real-time stream from a different camera is selected based on an audio stream associated with the real-time transmission and the second real-time transmission.

In some embodiments, the second real-time stream is selected in response to presence of a bar, an amplitude intensity, and/or a singing phrase in the audio stream.

In some aspects, the described systems and methods provide for a computer implemented method for processing a stream for real-time transmission, the method comprising the acts of receiving a real-time stream for an artistic performance, detecting one or more human persons in the real-time stream, ranking the detected one or more human persons in the real-time stream, selecting, based on the ranking, a subject from the detected one or more human persons, determining a subject framing for the real-time stream based on the selected subject, processing the real-time stream to select a portion of each frame in the real-time stream according to the subject framing, wherein the portion of each frame includes at least the subject, and transmitting the processed stream in real-time.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

DETAILED DESCRIPTION

As discussed above, conventional approaches to producing a live stream are cost prohibitive for many live events, such as local music concerts and comedy shows, that an end user may be interested in viewing. The inventors have recognized an autodirection system for producing a real-time transmission of an event that is advantageous over conventional approaches. In some embodiments, the described autodirection system does not require expensive camera equipment or a production crew to produce the real-time transmission.

In particular, the described systems and methods provide for, among other things, receiving one or more streams from one or more microphones and/or one or more cameras, synchronizing the received one or more streams to a current time, scoring each received stream with respect to one or more metrics, and based on the scored metrics, selecting a stream from the one or more streams for real time transmission.

The described systems and methods improve computerized real-time transmission technology by enabling automated capture of live video and/or audio feeds of a live event, direction of the live video and/or audio feeds in real time based on one or more metrics, and generation of a real-time transmission of the event for an end user. The direction and/or editing of the feeds of the live event is performed in real time and the end user receives the real-time transmission as soon as it is generated.

The described systems and methods provide a particular solution to the problem of providing a scalable, turn-key mechanism to automatically capture and direct a stream of a live event. The described systems and methods provide a particular way for automated generation of a real-time transmission by, among other things, receiving one or more streams from one or more microphones and/or one or more cameras, synchronizing the received one or more streams to a current time, scoring each received stream with respect to one or more metrics, and based on the scored metrics, selecting a stream from the one or more streams for real time transmission.

The described systems and methods may be used for several different purposes including, but not limited to, generating real-time transmissions of local, regional, national and international live events, musical concerts, comedy shows, theater plays, sports events, and other suitable live events. The end user may receive a personalized stream based on the user's preferences or a standard stream suitable for all end users. The end user may access a centralized location to stream available live events instead of searching through events scattered over multiple sources and difficult to find.

Figure 1:
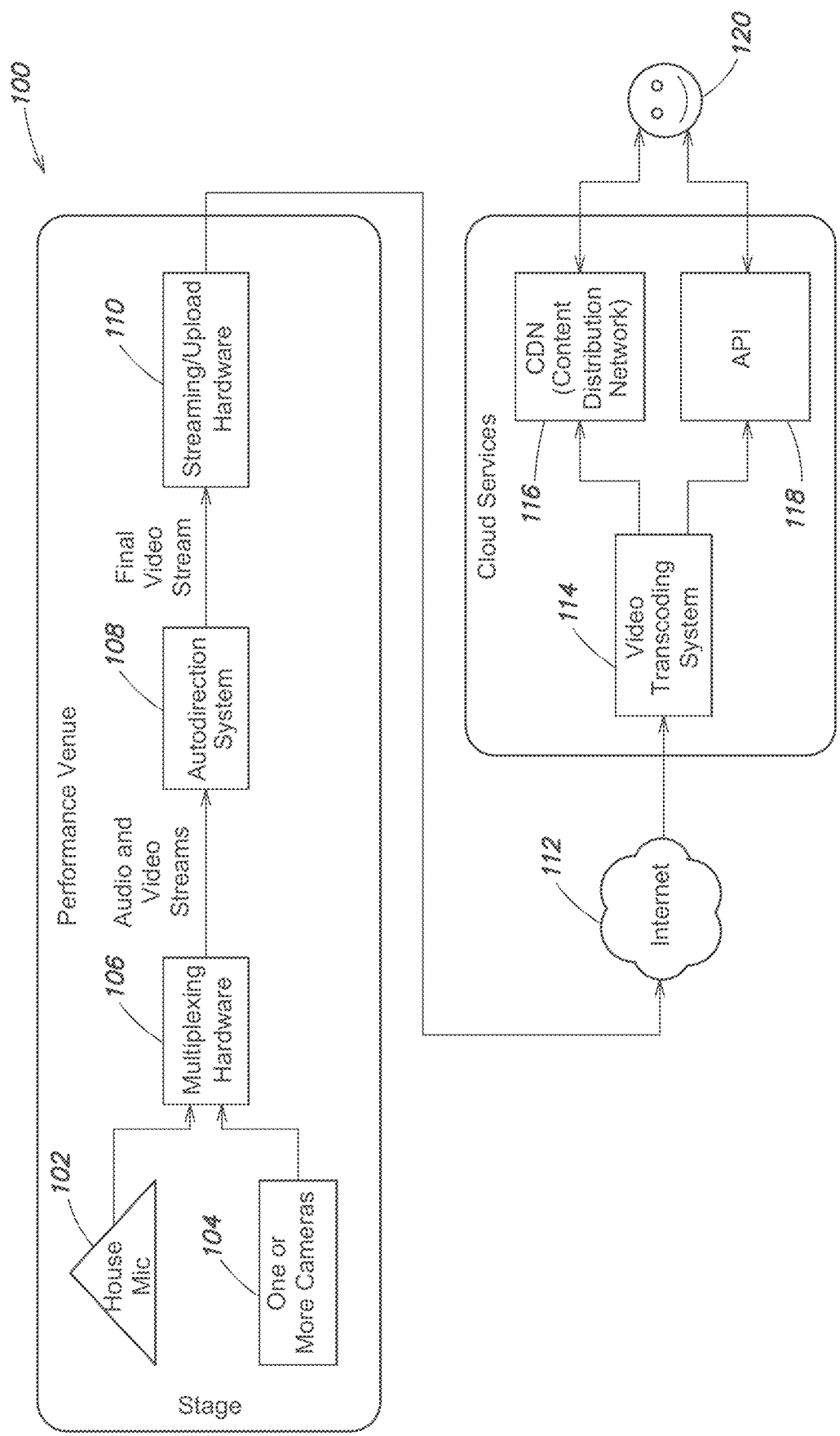
FIG. 1 is a block diagram of a real-time transmission production system including an exemplary autodirection system in accordance with some embodiments of the technology described herein.

FIG. 1 shows a block diagram 100 of a real-time transmission production system including an autodirection system in accordance with some embodiments of the technology described herein. In this illustrative embodiment, house microphone 102 is placed near the stage for a musical concert and one or more cameras 104 are positioned around the venue for the musical concert. House microphone 102 may include a microphone placed near the stage, one or more microphones placed near different performers, a soundboard connected to one or more microphones, and/or other suitable equipment for capturing audio from the event. Cameras 104 may be permanently or temporarily installed at the venue for the event. Additionally, cameras 104 may be stationary or moving, e.g., on rails, as suitable for capturing the video of the event. Optionally, one or more of cameras 104 may allow for control of panning and/or zooming functions of the physical camera, as suitable for capturing the video of the event. Though this illustrative embodiment is described with the respect to a musical concert, the described systems and methods are equally applicable to any event suitable for real-time transmissions to an end user, such as local, regional, national and international live events, comedy shows, theater plays, sports events, and other suitable live events.

One or more audio feeds from the house microphone 102 and one or more video feeds from cameras 104 may be sent to multiplexing hardware 106. The multiplexing hardware 106 may receive the audio and video feeds and convert them to a stream format appropriate for autodirection system 108. Optionally, the multiplexing hardware 106 may synchronize the audio and video feeds to a current time. Optionally, the multiplexing hardware 106 may convert one or more feeds from an analog format to a digital format or vice versa. In an example, the multiplexing hardware 106 includes hardware, such as the MUXLAB 500471-SA HDMI INPUT CARD manufactured by MUXLAB INC. of Quebec, Canada, to perform the described functionality. Autodirection system 108 may synchronize the video and audio streams, decide which streams to select, and generate a real-time transmission of the event. Streaming/upload hardware 110 may send the real-time transmission via the Internet 112 to a cloud service including a video transcoding system 114 for transcoding the real-time transmission and/or a content distribution network (CDN) 116 and/or application programming interface (API) 118 for delivery of the real-time transmission to end user 120. For example, the streaming/upload hardware 110 may include one or more servers for uploading the real-time transmission to the cloud service. The video transcoding system 114 may include one or more servers for transcoding the real-time transmission into one or more formats suitable for end user 120. The CDN 116 may include one or more servers for delivering the real-time transmission, transcoded or otherwise, to the end user 120. The API 118 may include functionality for a web-based service, such as a website offering a centralized location for accessing real-time transmissions, to stream the real-time transmission to end user 120.

Figure 2:
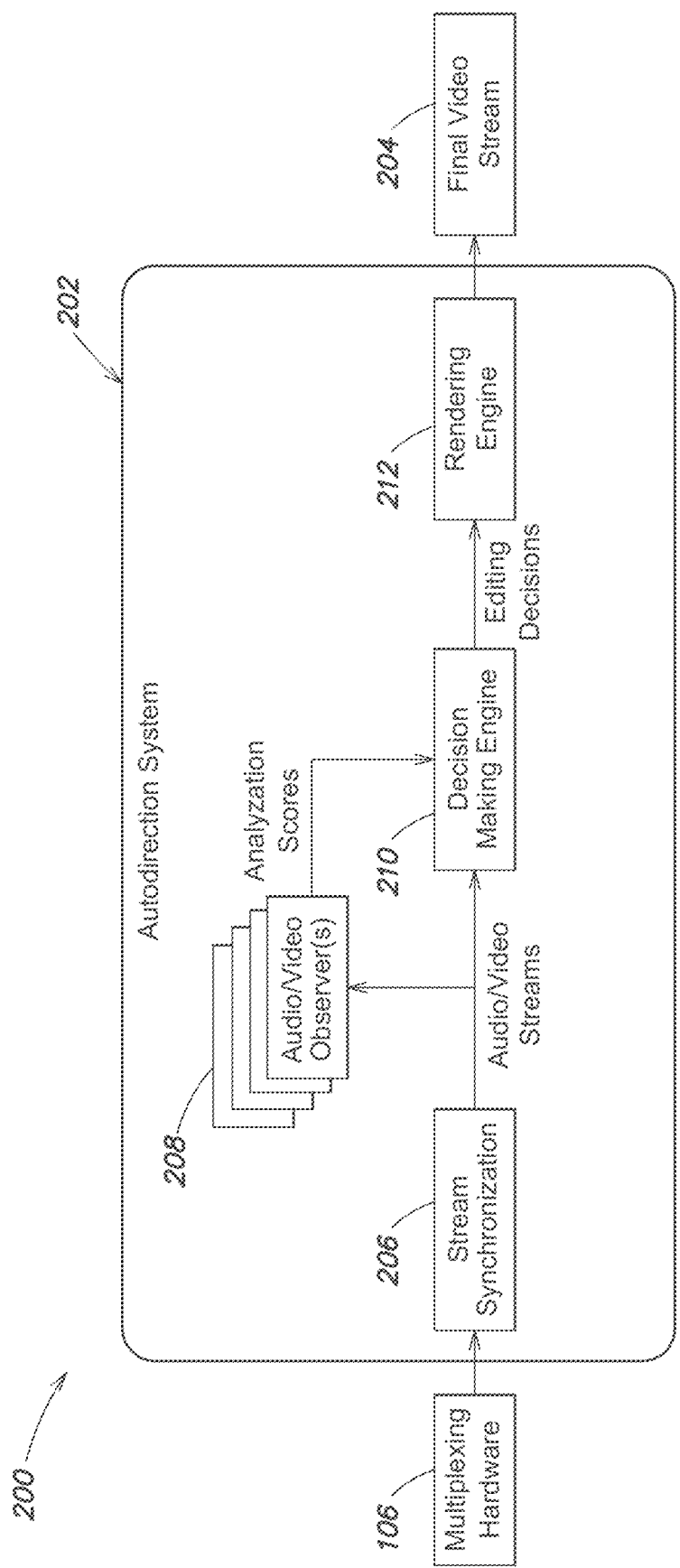
FIG. 2 is a block diagram of an autodirection system in accordance with some embodiments of the technology described herein.

FIG. 2 shows a block diagram 200 of an autodirection system in accordance with some embodiments of the technology described herein. Autodirection system 202 may receive audio and/or video streams from multiplexing hardware 106. Autodirection system 202 includes a component 206 for stream synchronization. Component 206 may receive audio streams input from a house microphone, a soundboard, and/or one or more microphones from different performers. Component 206 may also receive video streams from independent cameras and/or cameras plugged into same system. Cameras plugged into the same system may not need synchronization among each other because of no transmission lag. Independent cameras may be a few frames out of synchronization due to transmission lag. Cameras can be moving or stationary, permanently or temporarily installed. The audio and video streams may be synchronized using time stamps on each feed. Additionally or alternatively, the audio and video streams may be synchronized by comparing audio waveforms in each stream and synchronizing the streams. In some embodiments, the multiplexing hardware 106 is a part of the autodirection system to allow access to multiple audio and video streams at the same time. In some cases, signals from user cameras, e.g., smartphone cameras, are added to the video streams. The audio signals from the user cameras may be used to synchronize the video signal from the user cameras with the video streams from cameras 104.

Audio/video observer(s) 208 may receive the streams and analyze them based on audio and video metrics. The audio metrics may include voice detection, instrument detection, onset detection, intensity, larm, loudness, beat tracking, danceability, and/or other suitable audio metrics. Executing the instrument detection metric may include using machine learning to match an instrument in one or more video streams to the expected shape. Such an analysis may optionally include one or more audio streams of the event to match the instrument based on the type of sounds produced by the instrument. For example, one or more audio streams may be analyzed to determine that the instrument in question is a guitar based on the sounds from the instrument. Additionally or alternatively, a piece of tape that is detectable by one or more of cameras 104 may be attached to an instrument and tracked to follow the movement of the instrument on stage. Other metrics may include laughter (e.g., for a comedy event), applause (e.g., for a sports event), and other suitable metrics, e.g., those described at http://essentia.upf.edu/documentation/algorithms_reference.html, the entirety of which is incorporated herein by reference.

The video metrics may include motion tracking, vocalist identification, instrumentalist identification, and/or other suitable video metrics. Observers 208 may receive spatial and/or motion tracking information from sensors at venue. For motion tracking, a piece of tape that is detectable by one or more of cameras 104 may be attached to an artist and tracked to follow the movement of the artist on stage. Observers 208 may use machine learning to distinguish between instruments in the video streams. In some embodiments, observers 208 may use a machine learning model to match one or more instruments present in a video stream and/or an audio stream to their expected types of shape and/or their expected types of sound. For example, observers 208 may analyze a video stream and/or an audio stream to determine that the instrument in question has a type of shape and/or a type of sound associated with a guitar instrument. Observers 208 may use a machine learning model trained on data representative of types of shape and/or types of sound and their associated instruments. The machine learning model may receive as input processed versions of the audio stream and/or the video stream. Optionally, the audio stream may be processed to isolate aural characteristics of the particular instrumental sound being analyzed. Further, optionally, the video stream may be processed to isolate visual characteristics of the particular instrumental shape being analyzed. The aural and/or visual characteristics obtained from processing the audio stream and/or the video stream may be applied as inputs to the machine learning model in order to determine the corresponding instrument under analysis.

In some embodiments, an observer-based architecture may be employed for analyzing the incoming media streams. This type of architecture can be summarized using an analogy from sports broadcasting. In live sports broadcasting event, there are camera people, director's assistants and the director. The camera people are responsible for capturing the important elements of a sporting event, as well as choice shots of the crowd when something interesting is happening. The director's assistants watch over all the incoming camera feeds and flag what (from their perspective) the most important thing to focus on is. The director then makes the final decision on what shot to cut to and when. In the observer-based architecture being used, the inputs (e.g., the video and audio feeds) are akin to the camera people, the observer processes are akin to the director's assistants, and the decision making engine is akin to the director.

This architecture may allow for delegating the analysis of each audio/video media stream to a different observer process on the autodirection system 202. As each observer process analyzes its media stream, the process may continuously output a score for the metrics that the process is analyzing the stream for. This score may then be used by the decision making engine 210 to make edits to the media stream.

In some embodiments, each media stream (audio or video) is fed into an observer process that analyzes all the activated metrics for the media stream simultaneously. For example, in the case with three video streams and one audio stream, four observer processes may be required. Each observer process may analyze all metrics for each media stream. An advantage to this approach may be that all metrics can be scored and sent to the decision making engine 210 at the same time. However, because analysis of all metrics is happening inside a single observer process, a disadvantage to this approach may be that it takes longer to relay the observations to the decision engine. This may lead to inaccurate decisions as the decision making engine 210 may be forced to act before it receives information from all observers.

In some embodiments, each media stream is passed to multiple observers, with each observer being responsible for a single analysis metric. For example, in the case with three video streams and one audio stream, and five metrics, 20 observer processes may be required to assign one observer per media stream/metric. An advantage to this approach may be that analysis of the metrics may be completed in a shortened amount of time. A disadvantage to this approach may be that the decision making engine 210 may have to do additional work handling more, smaller chunks of score data from more observer processes.

In some embodiments, each media stream is passed to multiple observers, with each observer being responsible for a group of metrics. Each observer may be responsible for a group of metrics that are dependent on each other (e.g., instrument detection that requires audio and video analysis). This approach may be referred to as the compound metrics approach. Each observer process may analyze one media stream at a time, but each observer process may analyze a subset of all metrics (e.g., two metrics).

In some embodiments, each observer process may output scores for the metric(s) being observed to decision making engine 210. In some embodiments, some or all observer processes include their own decision engines to decide the best scored metric and only send those on the decision making engine 210. Depending on the type of media stream being scored and the metric being analyzed, the scores returned by observer processes may be used by the decision making engine 210 to determine a variety of things. The actual scoring values may depend on the metric being analyzed and the underlying analysis tools used to generate them. It is then the decision making engine's responsibility to interpret them and act accordingly.

Decision making engine 210 may receive scored metrics as input from observers 208 and decide on which video stream (and/or audio stream) to use. Decision making engine 210 and/or observers 208 may decide when/how often cuts between video streams should occur. For example, decision making engine 210 may decide when the cuts between the video streams should occur, while observers 208 may decide how often the cuts between the video streams should occur. Decision making engine 210 and/or observers 208 may decide when panning and/or zooming should occur. In some embodiments, panning may be accomplished by using a pan-and-scan technique. For example, a high-resolution video stream may be received and a portion of the stream may be selected using the pan-and-scan technique. The portion may be selected by decision making engine 210 and/or observers 208 based on the scored metrics received as input from observers 208. Decision making engine 210 may receive scored metrics asynchronously. In such cases, a threshold number of scored metrics may be required to be received before a decision is made. Decision making engine 210 may use one or more machine learning algorithms or a rule-based system or a combination thereof. The rule-based system may be defined based on event type (and/or venue, etc.). In the case of pre-defined rules, the machine learning system may override the pre-defined rules if there is a conflict or a vote may be taken between the two. In embodiments with a three camera system, camera 1 is shown until camera 2 or camera 3 is found to be more interesting. Decision making engine 210 performs analysis in real time. Therefore, a few frames may be missed before switching video streams, e.g., when a "drum solo" comes on. Decision making engine 210 and/or observers 208 may decide on whether to zoom into a given video stream. Decision making engine 210 and/or observers 208 may use a machine learning algorithm to artistically frame the subject. Rendering engine 212 generates real-time transmission 204 for end user. Once decisions have been made, they are passed to the rendering engine 212, where the chosen video stream and corresponding crops/zooms may be implemented. The edited video may then be paired with the audio stream and rendered down to the final real-time transmission. This final stream may be uploaded to a cloud-based transcoding system, passed to hardware responsible for uploading to the chosen transcoding solution, or another suitable destination.

In some embodiments, cameras can have zoom-related decisions happening at decision making engine 210. One reason to decide zoom levels at decision making engine 210 is that a preset zoom at the camera may give less information in the video stream. This can affect observer scoring negatively. In some embodiments, decision making engine 210 may have a preset zoom level of 50%. This may be helpful in cases where only panning is sufficient to initially generate the real-time transmission. Decision making engine 210 may subsequently alter the zoom level as the real-time transmission is further generated. In some embodiments, video streams from different kinds of cameras (e.g., pan-tilt-zoom, wide angle, etc.) may be combined in editing.

In some embodiments, decision making engine 210 incorporates a machine learning model that can detect desirability. For example, the model may be trained on recorded shows with live crews to determine what kinds of edits to make to the video streams.

In some embodiments, decision making engine 210 engine generates more than one final video stream based on user preferences. Decision making engine 210 may use cameras with wide fields of view and zoom in different portions of the video depending on the user. For example, for cameras with wide field of view, decision making engine 210 may have access to video streams including multiple subjects. Decision making engine 210 may personalize a video stream for a user who is a drummer fan to focus on the drummer, while the engine can personalize another video stream who is a guitar fan to focus on the guitar player, etc.

Figure 3:
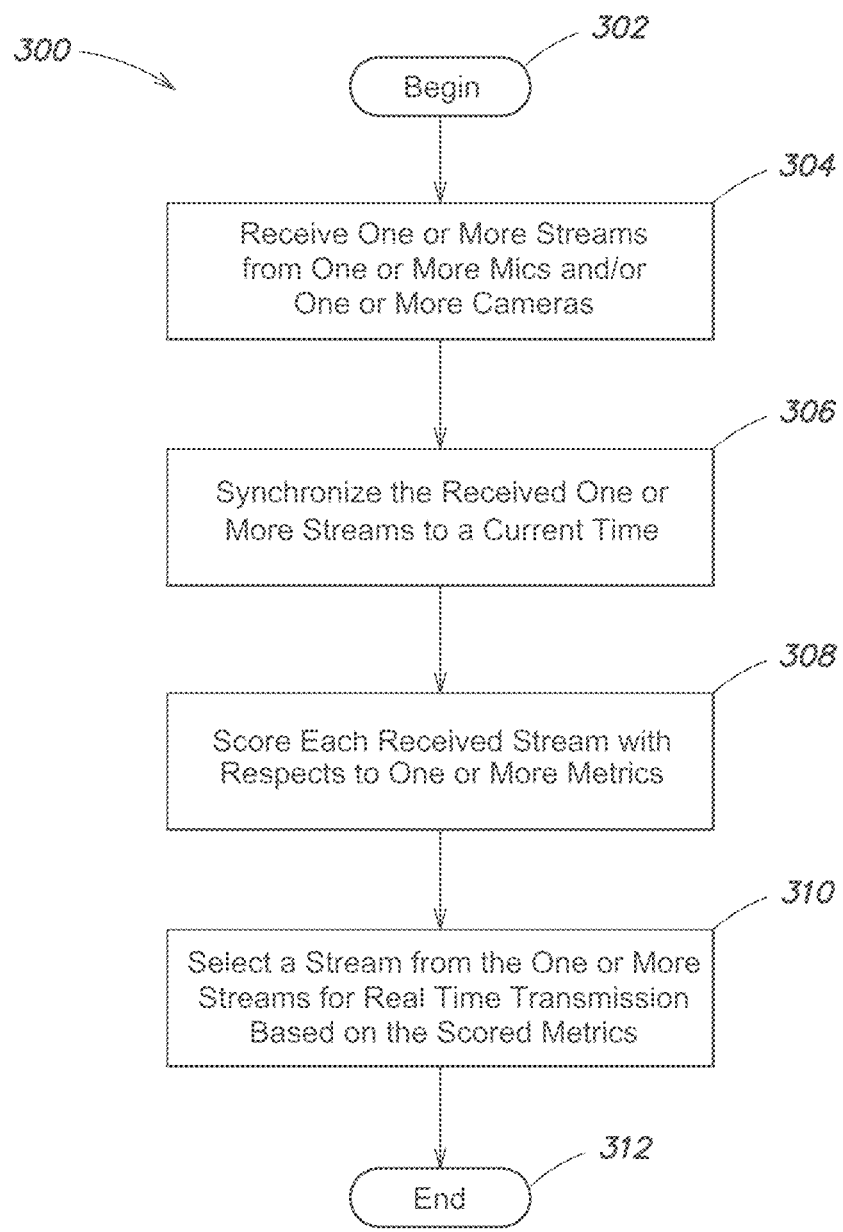
FIG. 3 is a diagram of an exemplary process for producing a real-time transmission of an event in accordance with some embodiments of the technology described herein.

FIG. 3 shows a diagram of an exemplary process 300 for producing a real-time transmission of an event in accordance with some embodiments of the technology described herein. In particular, at block 302, process 300 begins. At block 304, the autodirection system receives one or more streams from one or more microphones and/or one or more cameras. For example, the autodirection system may receive audio and/or video streams from multiplexing hardware. At block 306, the autodirection system synchronizes the received one or more streams to a current time. For example, the autodirection system may receive audio streams input from a house microphone, a soundboard, and/or one or more microphones from different performers. The autodirection system may also receive video streams from independent cameras and/or cameras plugged into same system. The audio and video streams may be synchronized using time stamps on each feed. Additionally or alternatively, the audio and video streams may be synchronized by comparing audio waveforms in each stream and synchronizing the streams. At block 308, the autodirection system scores each received stream with respect to one or more metrics. For example, the autodirection system may receive the streams and analyze them based on audio and video metrics. The audio metrics may include voice detection, instrument detection, onset detection, intensity, larm, loudness, beat tracking, danceability, and/or other suitable audio metrics. The video metrics may include motion tracking, vocalist identification, instrumentalist identification, and/or other suitable video metrics. At block 310, the autodirection system selects, based on the scored metrics, a stream from the one or more streams for real time transmission. For example, the autodirection system may receive scored metrics as input from one or more observer processes and decide, in real time, on which video stream (and/or audio stream) to use. Optionally, the autodirection system may decide when/how often cuts between video streams should occur and when panning and/or zooming should occur. The autodirection system may use one or more machine learning algorithms or a rule-based system or a combination thereof to make these decisions. At block 312, process 300 ends.

FIGS. 4-12 show exemplary embodiments for processing a stream for real-time transmission in accordance with some embodiments of the technology described herein. In some embodiments, a left camera, a right camera, and/or a center camera are permanently or temporarily installed at a venue of a live event. The center camera may also function as a "ghost" camera that provides the live video and/or audio feeds from the center camera without any zoom. In some embodiments, the ghost camera provides a wide establishing shot that slowly zooms in and out. Additionally or alternatively, a separate ghost camera may be permanently or temporarily installed at the venue of the live event.

In some embodiments, the autodirection system may include a processor in communication with memory. The processor may be configured to execute instructions for, among other things, an autodirection component stored in memory. The processor may detect one or more bodies of performers at the live event to include in the real-time transmission. For example, the processor may detect one or more bodies using OPENPOSE, TENSORRT, or another suitable algorithm(s), which may include a real-time multi-person keypoint detection library for, among other features, body, face, hands, and foot estimation. In some embodiments, the processor may determine a skeleton-based frame that includes one or more mandatory body parts before concluding that a body has been detected. OPENPOSE represents the first real-time multi-person system to jointly detect human body, hand, facial, and foot keypoints (in total 135 keypoints) on single images, and is accessible from the website, github.com/CMU-Perceptual-Computing-Lab/openpose, the entirety of which is incorporated by reference herein.

In some embodiments, if no bodies are detected at the live event, the processor may use one or more backup rules to estimate where the cameras should point to during the live event. For example, a band may like to perform with the lights off in order to provide an atmosphere appropriate for their performance. However, it may be difficult to detect any bodies of the performers in such a situation. The processor may use a backup rule to point the cameras to the center of the venue in such a situation. Additionally or alternatively, the processor may use a backup rule to sequentially cycle through different positions at the venue in order to capture the atmosphere of the performance. Additionally or alternatively, the processor may use a backup rule for "NO-S" subject framing where no subject is found, e.g., because it is too dark. This subject framing may be wide enough to include all or a large portion of the venue stage, to ensure that no interesting action may be missed. It is noted that the subject framing may include a selection of one or more subjects, or in this case, a determination that no subject was found.

In some embodiments, camera switching between camera feeds may continue as normal in cases where no subject is found as long as it is determined that a performance is being conducted based on a band fingerprint (or heat mapping). A band fingerprint may include position, movement, and/or topology of, e.g., the band members. For example, the band fingerprint may include information, stored in a cache, on where the band members were standing before it was too dark. The cache may be refreshed periodically. The cache may be checked to determine whether people are setting up the next performance, the performers have changed to a different band, and/or whether a band is playing or not. In some embodiments, the band fingerprint may be used to black out a band in case they would like to opt out of the real-time transmission of the performances at the venue.

In some embodiments, there may be no subjects found before the performance has started and/or between band setups. In these cases, the cameras may not switch as fast as when there is a band playing, so the camera switching may be slowed down. For example, if no band is playing, then the camera switching may happen differently, e.g., every 30 seconds, compared to every 10 seconds when a band is playing. Additionally or alternatively, the camera switching may not happen at all, and instead the ghost camera output feed may be shown until a band is detected.

In some embodiments, the processor may detect where the singer in the performance is present in addition to detecting one or more bodies of the performers. For example, the processor may determine the performer in the center of the stage to be the singer. In another example, the processor may determine the performer having another performer on either side to be the singer. In some embodiments, data relating to the current feed is provided as input to a recurrent neural network trained to detect a singer. The recurrent neural network may be trained on data where faces of performers are tagged as singing or not singing. For example, the recurrent neural network may be more than 90% accurate, or another suitable threshold, in identifying when a performer is not singing. In some embodiments, the singer may be the highest priority or ranked subject and, once detected, may automatically be selected as the subject of the frame at the next interval when the subject framing and/or the camera feed are selected. In some embodiments, if a singer is detected and the current subject is not that singer, a penalty may be issued (described further below with respect to FIG. 5) to hasten the next selection of the subject framing and/or camera feed. In some embodiments, data relating to the current feed is provided as input to a recurrent neural network trained to detect a guitar solo or another suitable interesting portion of the performance. The recurrent neural network may be trained on data where performers are tagged as performing a guitar solo or not.

Figure 4:
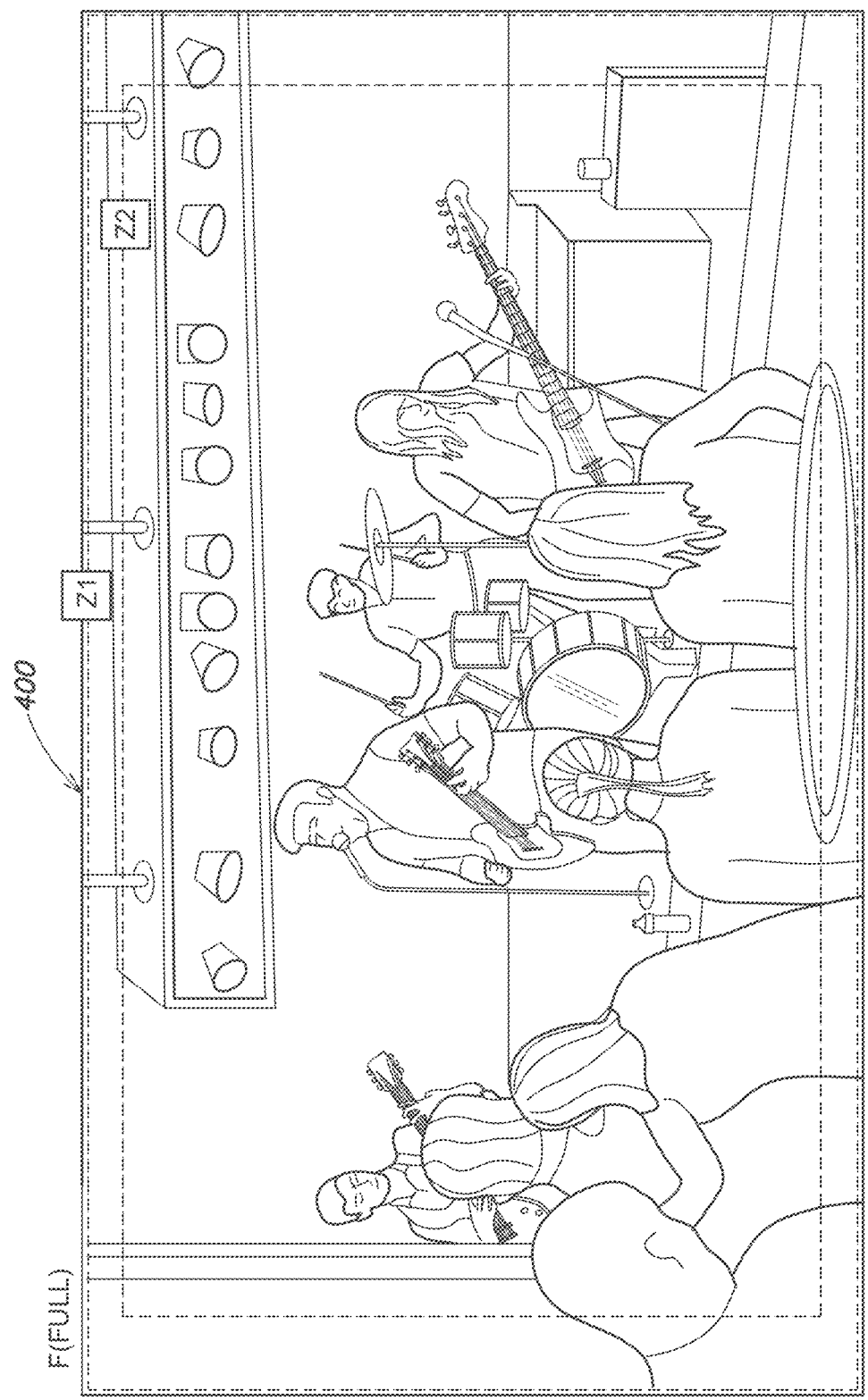
FIGS. 4-12 show exemplary embodiments for processing a stream for real-time transmission in accordance with some embodiments of the technology described herein.

FIG. 4 shows an exemplary embodiment 400 for processing a stream for real-time transmission in accordance with some embodiments of the technology described herein. In FIG. 4, a frame from the center camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows the full view without focusing on any of the subjects. This configuration may be represented as Camera (C): Center, Subject Framing (F): Full, Zoom (Z): Z1 or Z2; and Penalty (Q): 0. In some embodiments, the processor may determine one or more subjects for the frame, represented as S+n, where n indicates an additional number of subjects. More details regarding the Penalty (Q) are provided further below.

Figure 5:
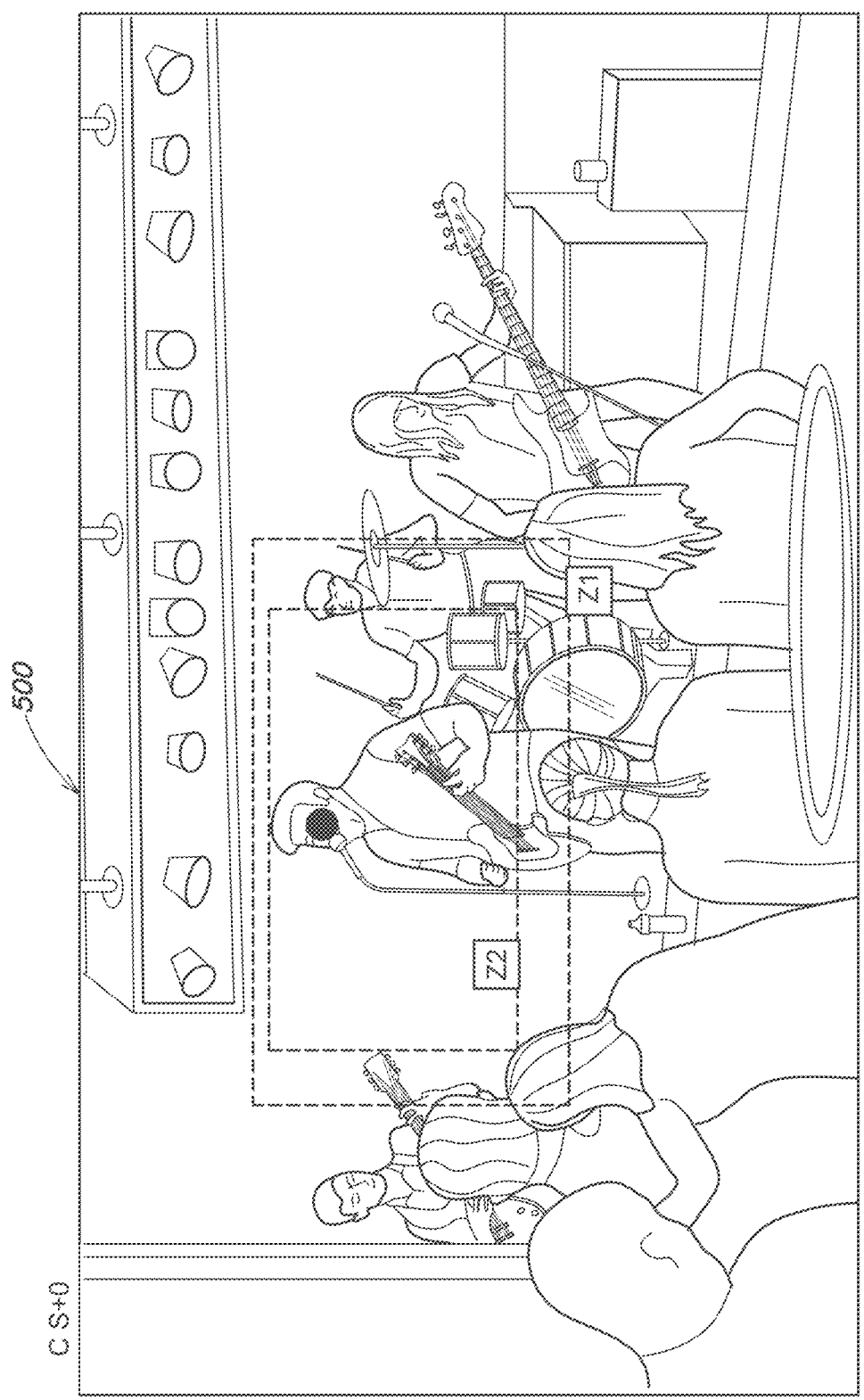

FIG. 5 shows an exemplary embodiment 500 for processing a stream for real-time transmission in accordance with some embodiments of the technology described herein. In FIG. 5, a frame from the center camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows a subject determined by the processor and annotated with an indicator (e.g., annotated with a dot). This configuration may be represented as C: Center, F: S+0, Z: Z1 or Z2; and Penalty(Q): 0.

In some embodiments, the center camera with the Full (F) subject framing described above with respect to FIG. 4 may be equivalent to a cameraman with a camera mounted on a tripod at the back of the venue, providing a dramatic overview including the look and feel of the performers. In some embodiments, using the same center camera, but with the S+0 subject framing (or another suitable subject framing), may be equivalent to a cameraman with a handheld camera positioned in the middle of the venue, providing action shots of the performance. Similarly, using the left or right camera, with the S+0 subject framing (or another suitable subject framing), may be equivalent to a cameraman positioned at the left or right of the venue, respectively.

In some embodiments, the processor may decide whether to use S+0, S+1, S+2, or another suitable S+n subject framing, using two sets of probabilities: one for when there is someone singing, and another when there is not. When there is someone singing, the processor may select to use tighter shots like S+0 to get the close up shots of the singer, and when there is no singer, the processor may raise the probability of S+1 and/or S+2 to simultaneously get a more varied look as well as avoid focusing on someone who is not important to the performance.

In some embodiments, in order to determine one subject for the frame, the processor may determine multiple subjects, rank the detected subjects, and select the highest ranked subject. The ranking may be determined based on one or more factors including, but not limited to, whether a subject is the singer, a subject's proximity to a center of the stage or venue, whether a subject is in motion, and how long a given subject has been tracked as a subject. For example, the processor may determine the head of the subject using OPENPOSE and select the top, bottom, center, or another suitable portion of the head to indicate the presence of the subject. The processor may determine margins for the left, center, top, and/or bottom with respect to the indicator for the subject. The processor may use the margins to ensure that the subject is correctly positioned and visible in the frame. In some embodiments, the processor may determine the size of the head of the subject in order to determine a distance of the subject from the camera. In some embodiments, margins of the subject framing may directly correspond to the head size. As a subject comes closer to the camera, the processor may zoom out and keep the subject in frame because their head size is seeming to grow. Additionally or alternatively, a performer, e.g., a drummer, who is far away from the camera may not be considered as a subject and may be disqualified based on head size, e.g., based on a threshold head size for subject selection.

In some embodiments, the processor may issue a penalty for frames where the subject is partially or wholly out of the frame, tracking of the subject has failed, noise is present in movement detection of the subject, and/or another suitable situation where the frame does not look acceptable for transmission to the viewer. The penalty may be used as a threshold to override the current camera feed and cut away to the video feed from one of the other cameras. For example, if another camera feed is typically selected between six to eight seconds, the penalty may force the other camera feed to be selected sooner than this threshold period.

Figure 6:
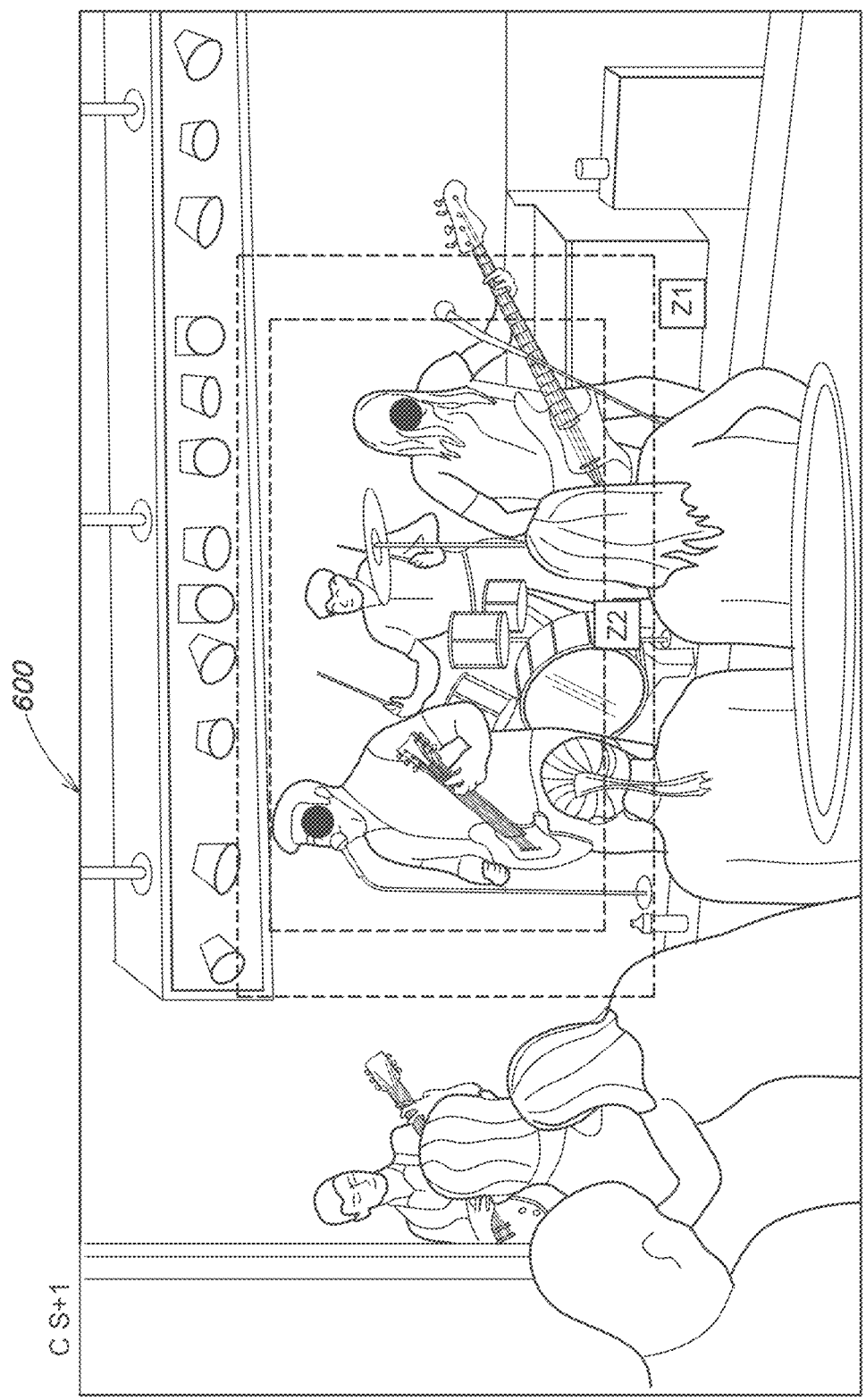

FIG. 6 shows an exemplary embodiment 600 for processing a stream for real-time transmission in accordance with some embodiments of the technology described herein. In FIG. 6, a frame from the center camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows two subjects determined by the processor and annotated with indicators (e.g., annotated with dots). This configuration may be represented as C: Center, F: S+1, Z: Z1 or Z2; and Penalty(Q): 0. In some embodiments, in order to determine two subjects for the frame, the processor may determine multiple subjects, rank the detected subjects, and select the two highest ranked subjects.

Figure 7:
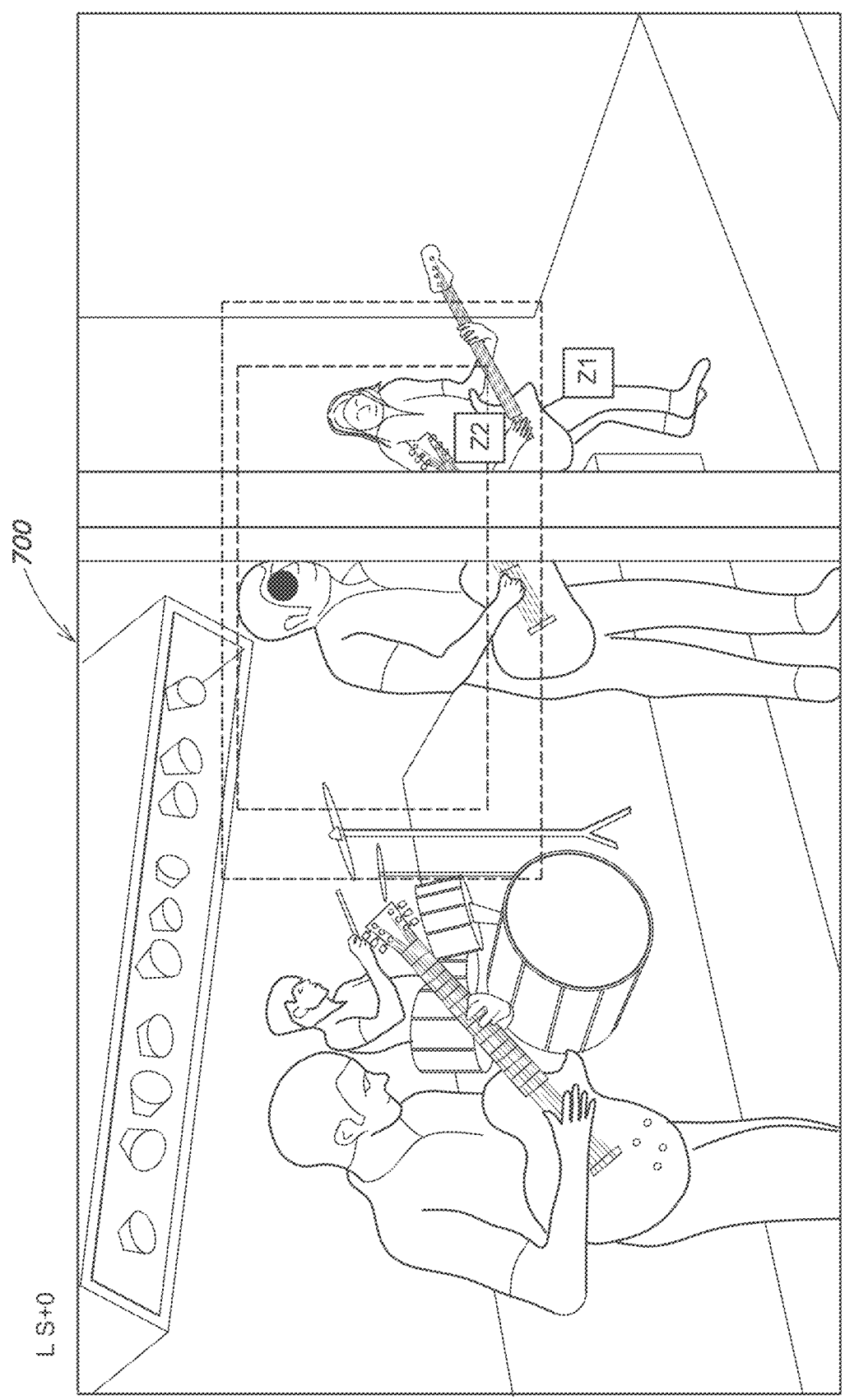

FIG. 7 shows an exemplary embodiment 700 for processing a stream for real-time transmission in accordance with some embodiments of the technology described herein. In FIG. 7, a frame from the left camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows a subject determined by the processor and annotated with an indicator (e.g., annotated with a dot). This configuration may be represented as C: Left, F: S+0, Z: Z1 or Z2; and Penalty(Q): 0. In some embodiments, in order to determine one subject for the frame, the processor may determine multiple subjects, rank the detected subjects, and select the highest ranked subject. In some embodiments, the processor may switch to the left camera's video feed based on sound onset detection. The processor may receive the audio feed associated with the performance and determine one or more events to indicate whether it is appropriate to switch to a different camera's feed. For example, an event may include changes in a bar measure. The bar may represent a segment of time corresponding to a specific number of beats in which each beat is represented by a particular note value. In another example, an event may include a change in amplitude intensity, e.g., the beginning or end of another section of the performance. In yet another example, one or more singing phrases may signal the beginning or end of another section of the performance.

Figure 8:
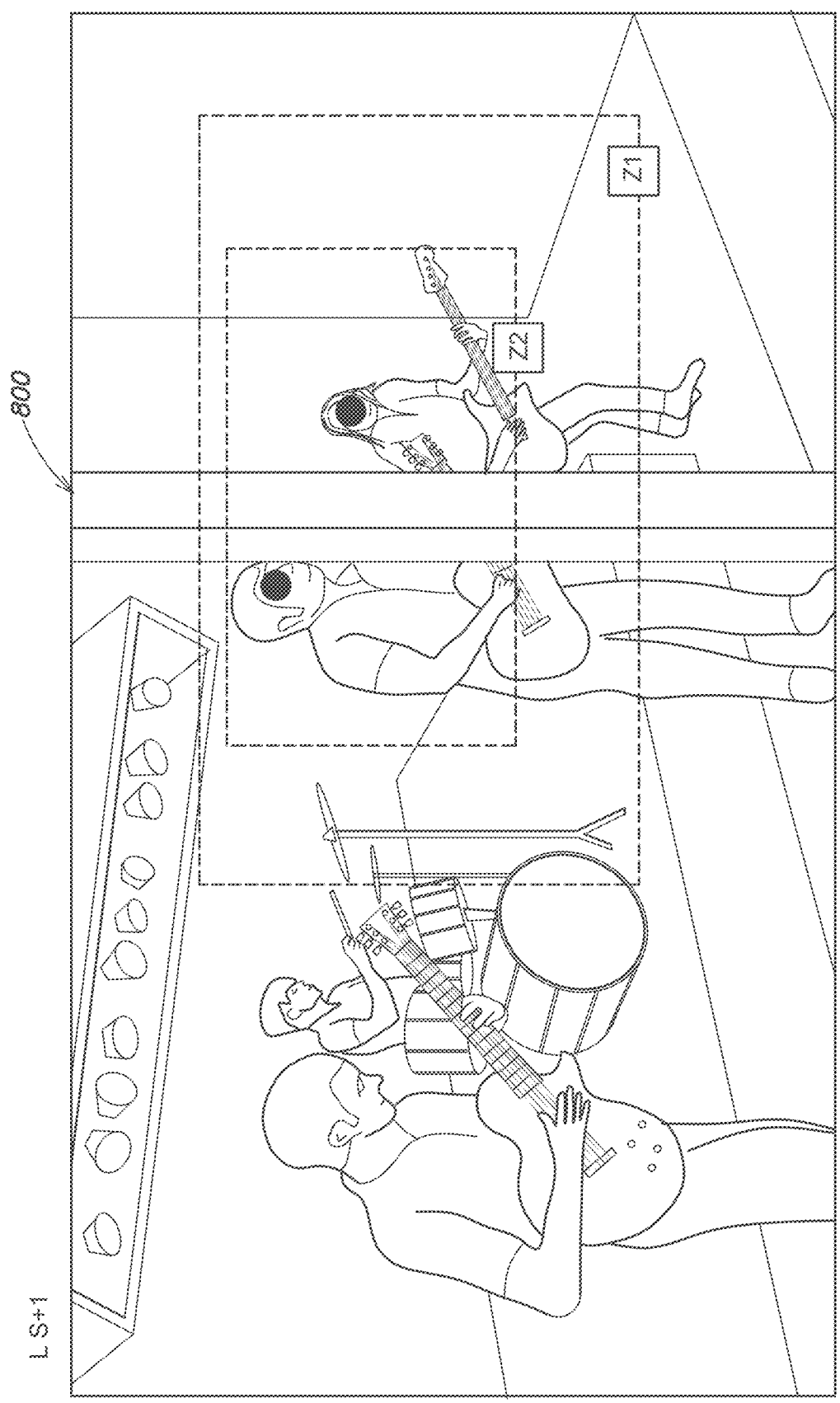

FIG. 8 shows an exemplary embodiment 800 for processing a stream for real-time transmission in accordance with some embodiments of the technology described herein. In FIG. 8, a frame from the left camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows two subjects determined by the processor and annotated with indicators (e.g., annotated with dots). This configuration may be represented as C: Left, F: S+1, Z: Z1 or Z2; and Penalty(Q): 0. In some embodiments, in order to determine two subjects for the frame, the processor may determine multiple subjects, rank the detected subjects, and select the two highest ranked subjects. In some embodiments, the camera feeds may be switched within a threshold period, e.g., every six to eight seconds, and an appropriate switching time within the threshold period may be selected based on one of the events described above.

Figure 9:
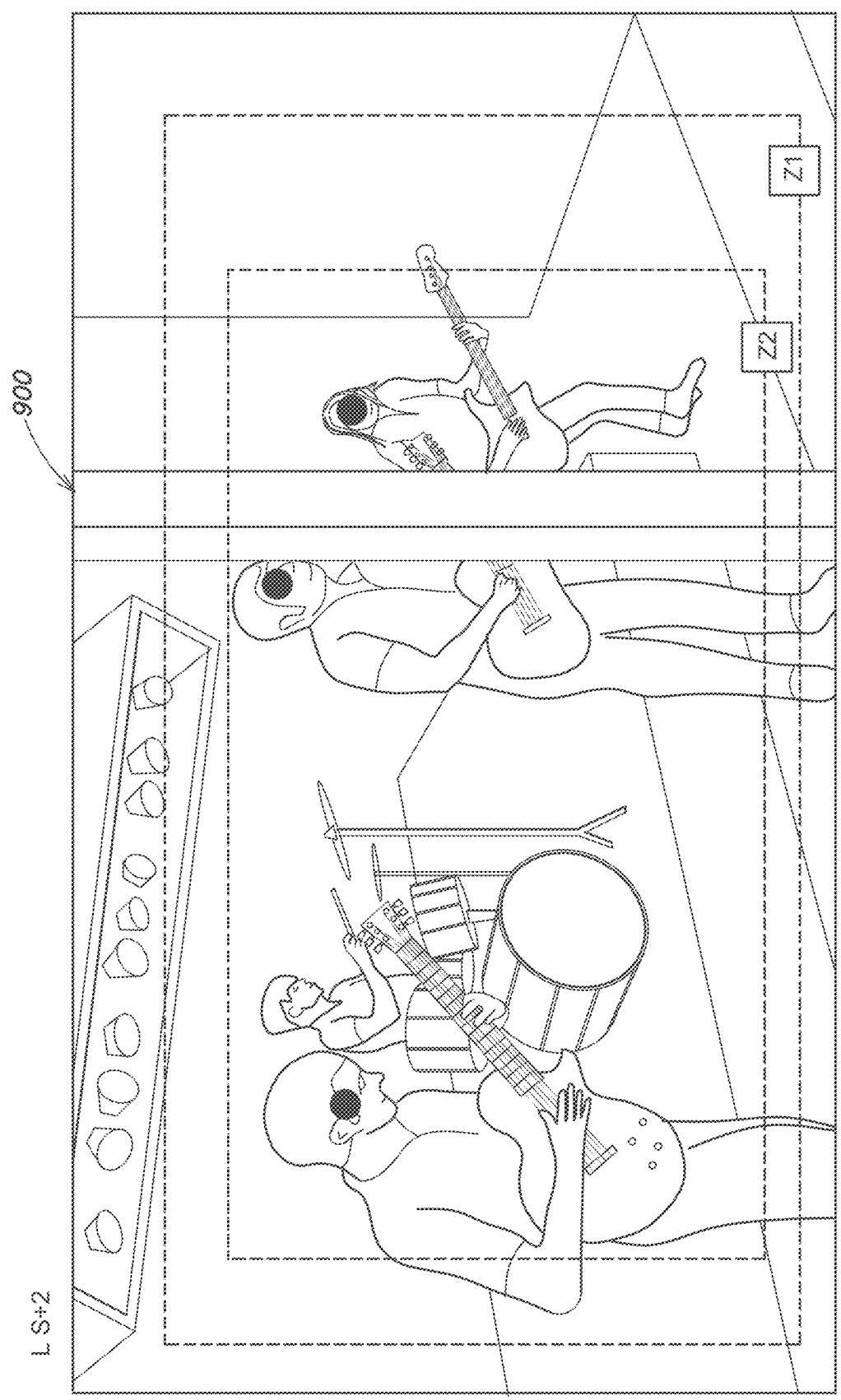

FIG. 9 shows an exemplary embodiment 900 for processing a stream for real-time transmission in accordance with some embodiments of the technology described herein. In FIG. 9, a frame from the left camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows three subjects determined by the processor and annotated with indicators (e.g., annotated with dots). This configuration may be represented as C: Left, F: S+2, Z: Z1 or Z2; and Penalty(Q): 0. In some embodiments, in order to determine three subjects for the frame, the processor may determine multiple subjects, rank the detected subjects, and select the three highest ranked subjects. In some embodiments, in order to maintain a resolution quality of the feed, the processor may enforce a minimum frame size. For example, with a 4K resolution video feed, in order to maintain a 720p resolution stream, the processor may at most zoom into the frame such that the minimum height is a third of the original frame.

Figure 10:
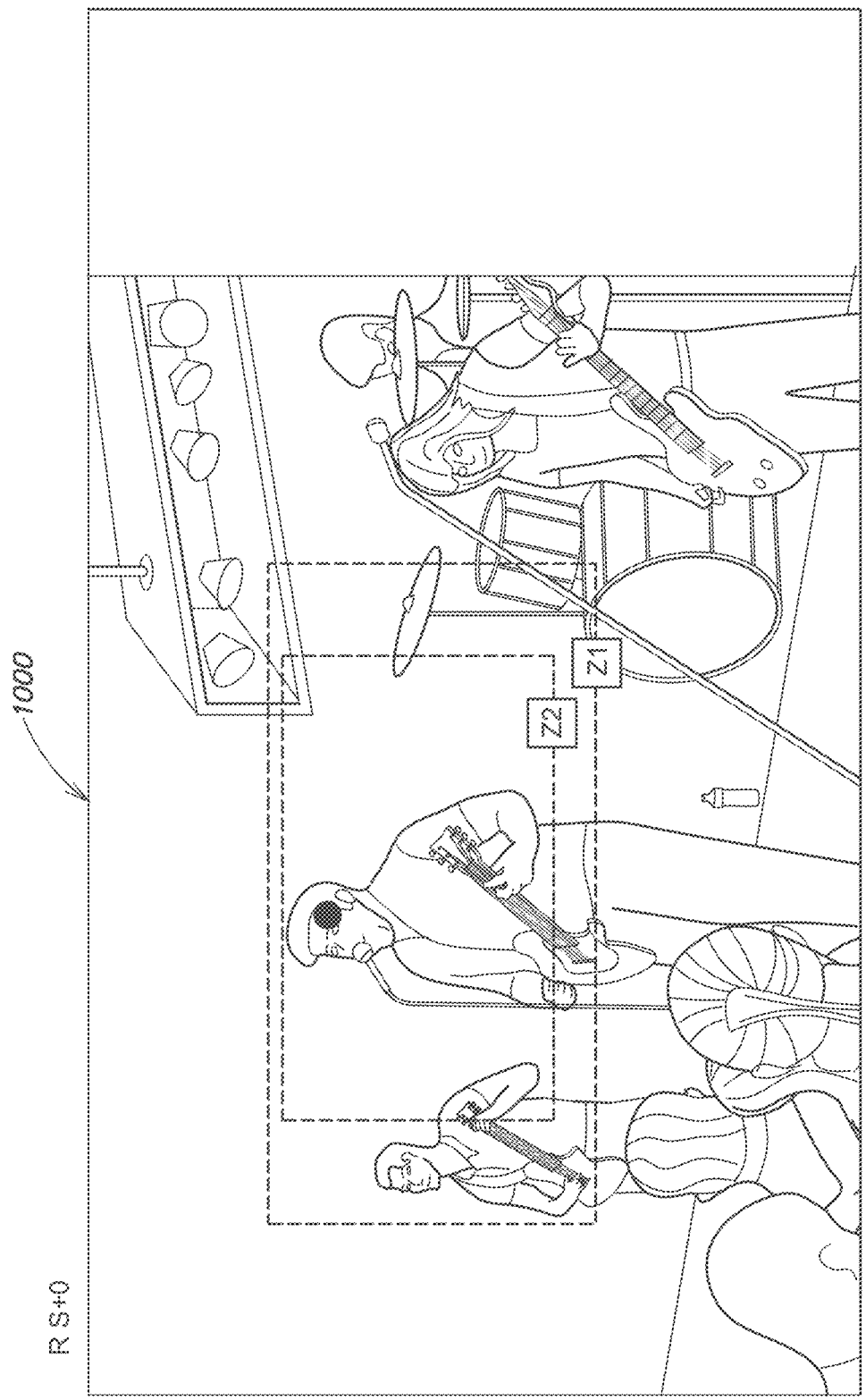

FIG. 10 shows an exemplary embodiment 1000 for processing a stream for real-time transmission in accordance with some embodiments of the technology described herein. In FIG. 10, a frame from the right camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows a subject determined by the processor and annotated with an indicator (e.g., annotated with a dot). This configuration may be represented as C: Right, F: S+0, Z: Z1 or Z2; and Penalty(Q): 0. In some embodiments, in order to determine the subject for the frame, the processor may determine multiple subjects, rank the detected subjects, and select the highest ranked subject. In some embodiments, the camera feeds may be switched within a threshold period, e.g., every six to eight seconds, and an appropriate switching time within the threshold period may be selected based on one of the events described above.

Figure 11:
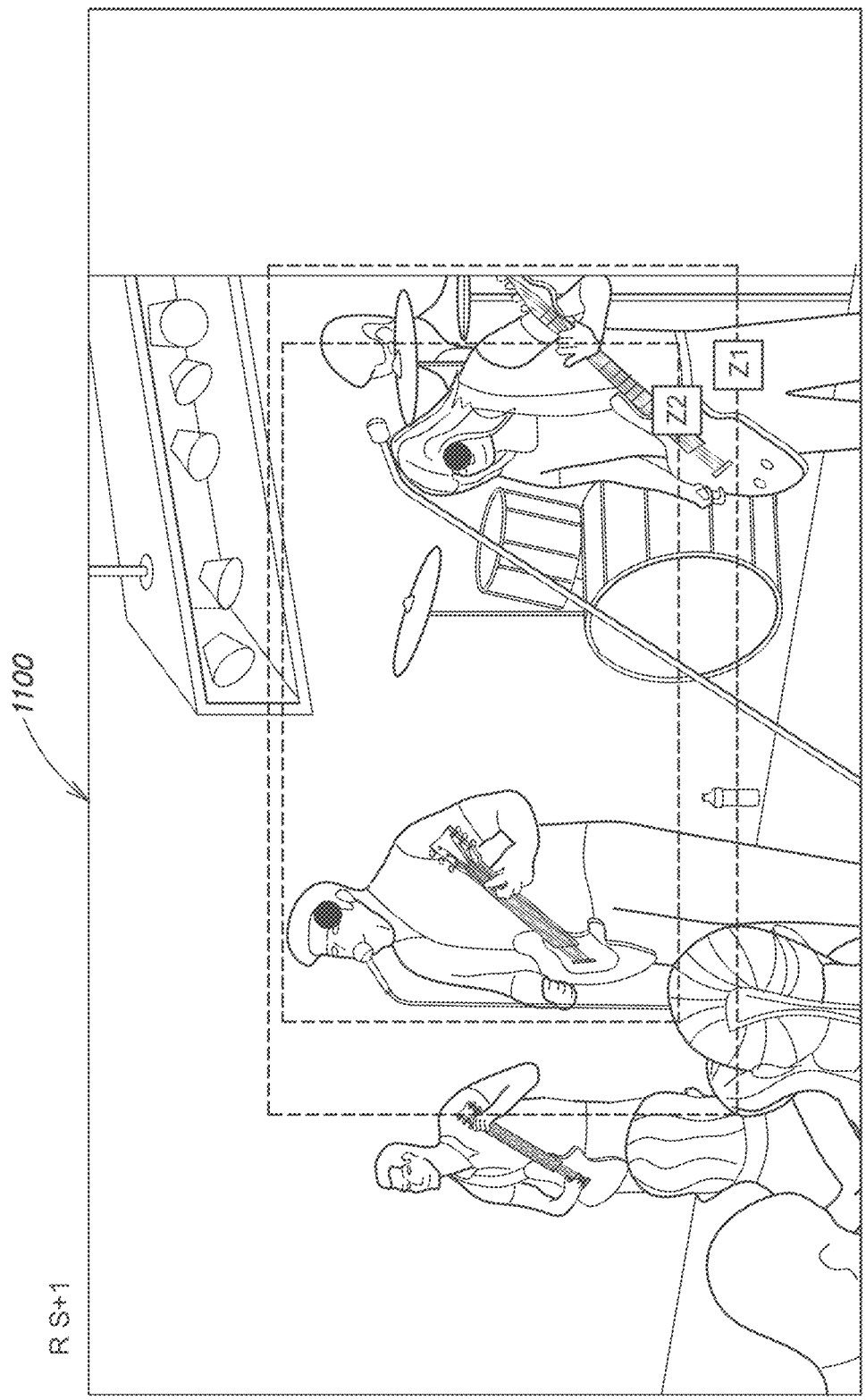

FIG. 11 shows an exemplary embodiment 1100 for processing a stream for real-time transmission in accordance with some embodiments of the technology described herein. In FIG. 11, a frame from the right camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows two subjects determined by the processor and annotated with indicators (e.g., annotated with dots). This configuration may be represented as C: Right, F: S+1, Z: Z1 or Z2; and Penalty(Q): 0. In some embodiments, in order to determine the subjects for the frame, the processor may determine multiple subjects, rank the detected subjects, and select the two highest ranked subjects. In some embodiments, the camera feeds may be switched within a threshold period, e.g., every six to eight seconds, and an appropriate switching time within the threshold period may be selected based on one of the events described above.

Figure 12:
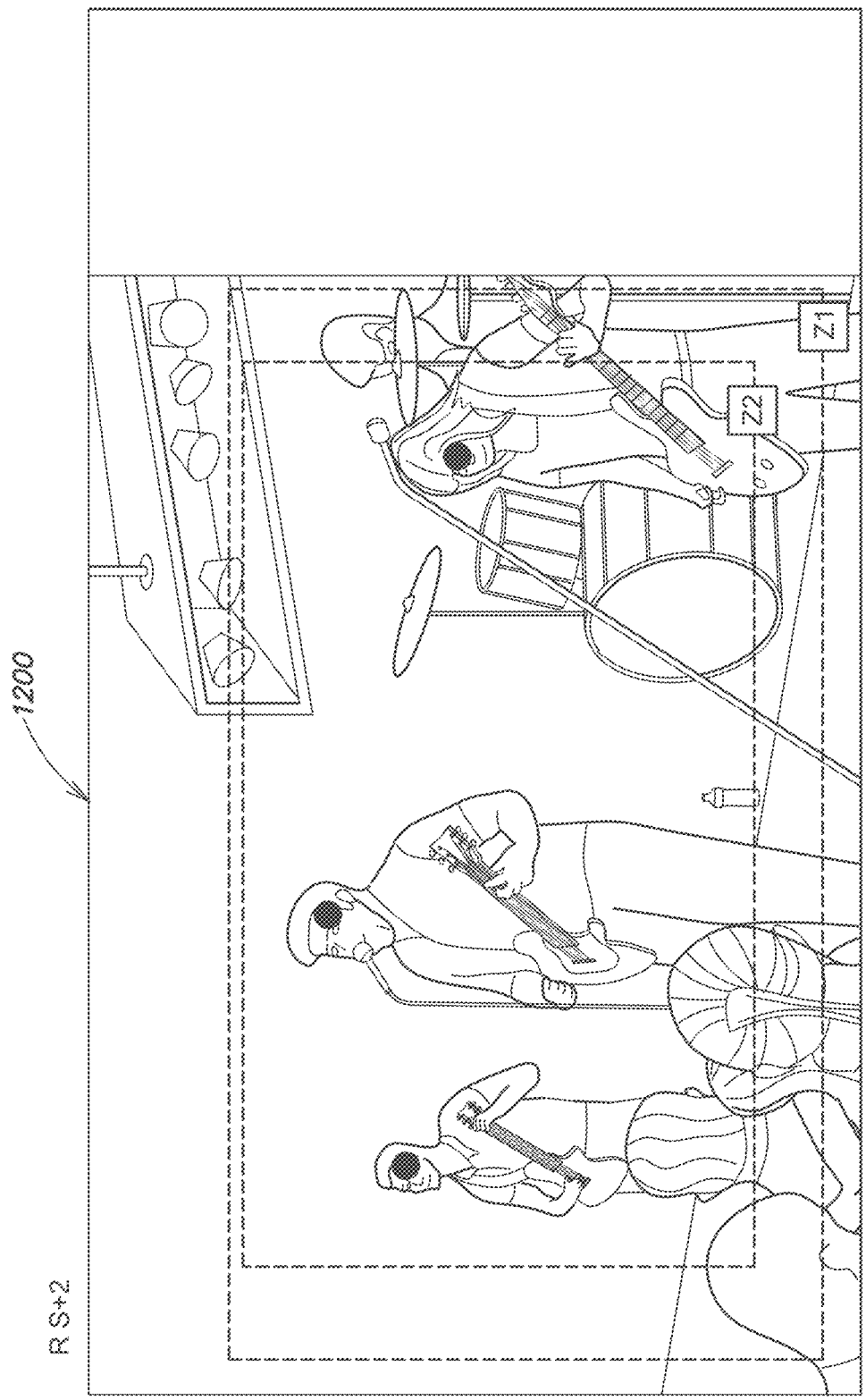

FIG. 12 shows an exemplary embodiment 1200 for processing a stream for real-time transmission in accordance with some embodiments of the technology described herein. In FIG. 12, a frame from the right camera's video feed is shown. Z1 and Z2 represent the possible zoom levels available when processing this frame, though the options may not be so limited. In some embodiments, the processor may constantly zoom between levels Z1 and Z2 to give an impression of motion to the viewer. This frame shows three subjects determined by the processor and annotated with indicators (e.g., annotated with dots). This configuration may be represented as C: Right, F: S+2, Z: Z1 or Z2; and Penalty(Q): 0. In some embodiments, in order to determine the subjects for the frame, the processor may determine multiple subjects, rank the detected subjects, and select the three highest ranked subjects. In some embodiments, the camera feeds may be switched within a threshold period, e.g., every six to eight seconds, and an appropriate switching time within the threshold period may be selected based on one of the events described above.

Figure 13:
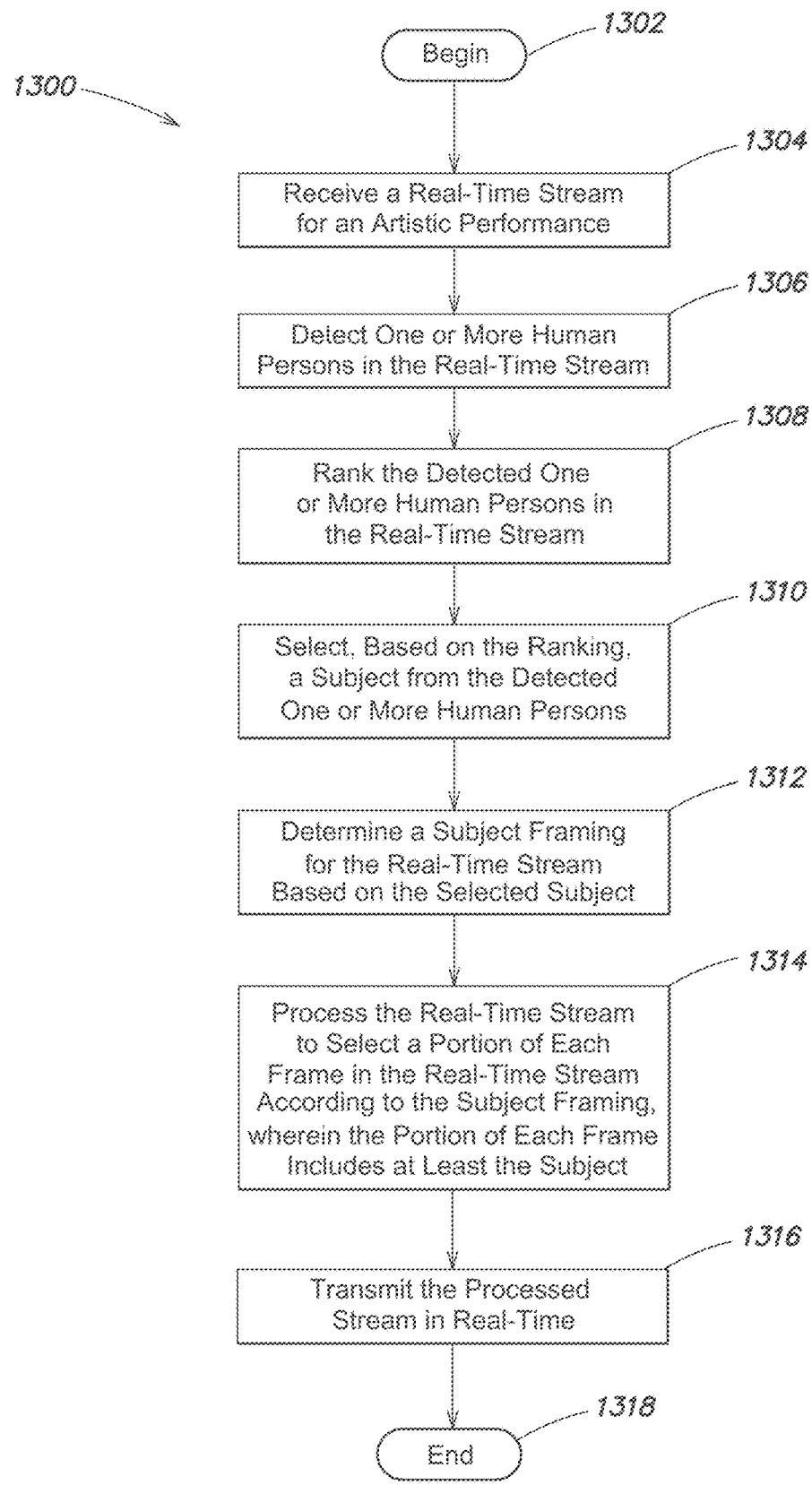
FIG. 13 is a diagram of another exemplary process for producing a real-time transmission of an event in accordance with some embodiments of the technology described herein.

In some embodiments, the probabilities of the camera, subject, subject framing and re-framings, and/or zooms are based on stylistic/artistic preferences. Within these probabilities, some multipliers may be provided that make some of the probabilities weighted heavier. Some multipliers and over-riders may pertain to speed/acceleration of the subject, whether or not someone is singing, and if there is or is not anyone on stage at all. FIG. 13 is a diagram of an exemplary process 1300 for producing a real-time transmission of an event in accordance with some embodiments of the technology described herein. Process 1300 may be implemented on a system comprising a processor in communication with memory. The processor may be configured to execute instructions for an autodirection component stored in memory that cause the processor to perform process 1300.

At block 1302, process 1300 begins.

At block 1304, the processor may receive a real-time stream for an artistic performance. In some embodiments, the real-time stream is captured from one or more cameras including a left camera, a right camera, and/or a center camera.

At block 1306, the processor may detect one or more human persons in the real-time stream. In some embodiments, detecting one or more human persons in the real-time stream may include detecting a human body and/or one or more mandatory parts. In some embodiments, the one or more mandatory parts may include an eye, an elbow, and a shoulder. In some embodiments, a distance of the subject from a camera capturing the real-time stream may be determined based on a size of the head of the subject.

In some embodiments, a second real-time stream for the artistic performance may not be further analyzed subsequent to detecting no human person in the second real-time stream. In some embodiments, a second real-time stream for the artistic performance may be analyzed using one or more backup rules subsequent to detecting no human person in the second real-time stream.

At block 1308, the processor may rank the detected one or more human persons in the real-time stream. In some embodiments, the detected one or more human persons may be ranked based on proximity to a camera that captures the real-time stream. In some embodiments, the detected one or more human persons may be ranked based on determining which human person is singing in the artistic performance. In some embodiments, the detected one or more human persons may be ranked based on proximity to a center of each frame in the real-time stream.

At block 1310, the processor may select, based on the ranking, a subject from the detected one or more human persons. In some embodiments, a second human person may be selected in addition to the subject, and the portion of each frame includes the subject and the second human person.

At block 1312, the processor may determine a subject framing for the real-time stream based on the selected subject. In some embodiments, determining the subject framing may include determining that one of the human persons is singing and selecting that human person as the only subject for the portion of each frame. In some embodiments, determining the subject framing may include determining that none of the human persons is singing and selecting two or more human persons as the subjects for the portion of each frame, wherein the portion of each frame includes both the subjects.

At block 1314, the processor may process the real-time stream to select a portion of each frame in the real-time stream, wherein the portion of each frame includes the subject. In some embodiments, the portion of each frame may be selected based on maintaining a minimum margin between the head of the subject and an edge of the portion of the frame. In some embodiments, processing the real-time stream may further include selecting a zoom level for selecting the portion of each frame of the real-time stream. In some embodiments, processing the real-time stream may further include selecting a first zoom level for some frames of the real-time stream and a second zoom level for remaining frames of the real-time stream.

In some embodiments, the system may determine a penalty based on a quality of the real-time stream. In some embodiments, the quality of the real-time stream may include whether the subject is trackable, whether the subject is out of frame, and/or whether there is noise in detection of the subject.

At block 1316, the processor may transmit the processed stream in real-time. In some embodiments, a second real-time stream from a different camera may be selected based on a threshold time passing subsequent to an initial transmission of the processed stream. In some embodiments, a second real-time stream from a different camera may be selected based on an audio stream associated with the real-time transmission and the second real-time transmission. In some embodiments, the second real-time stream may be selected in response to presence of a bar, an amplitude intensity, and/or a singing phrase in the audio stream.

At block 1318, process 1300 ends.

Figure 14:
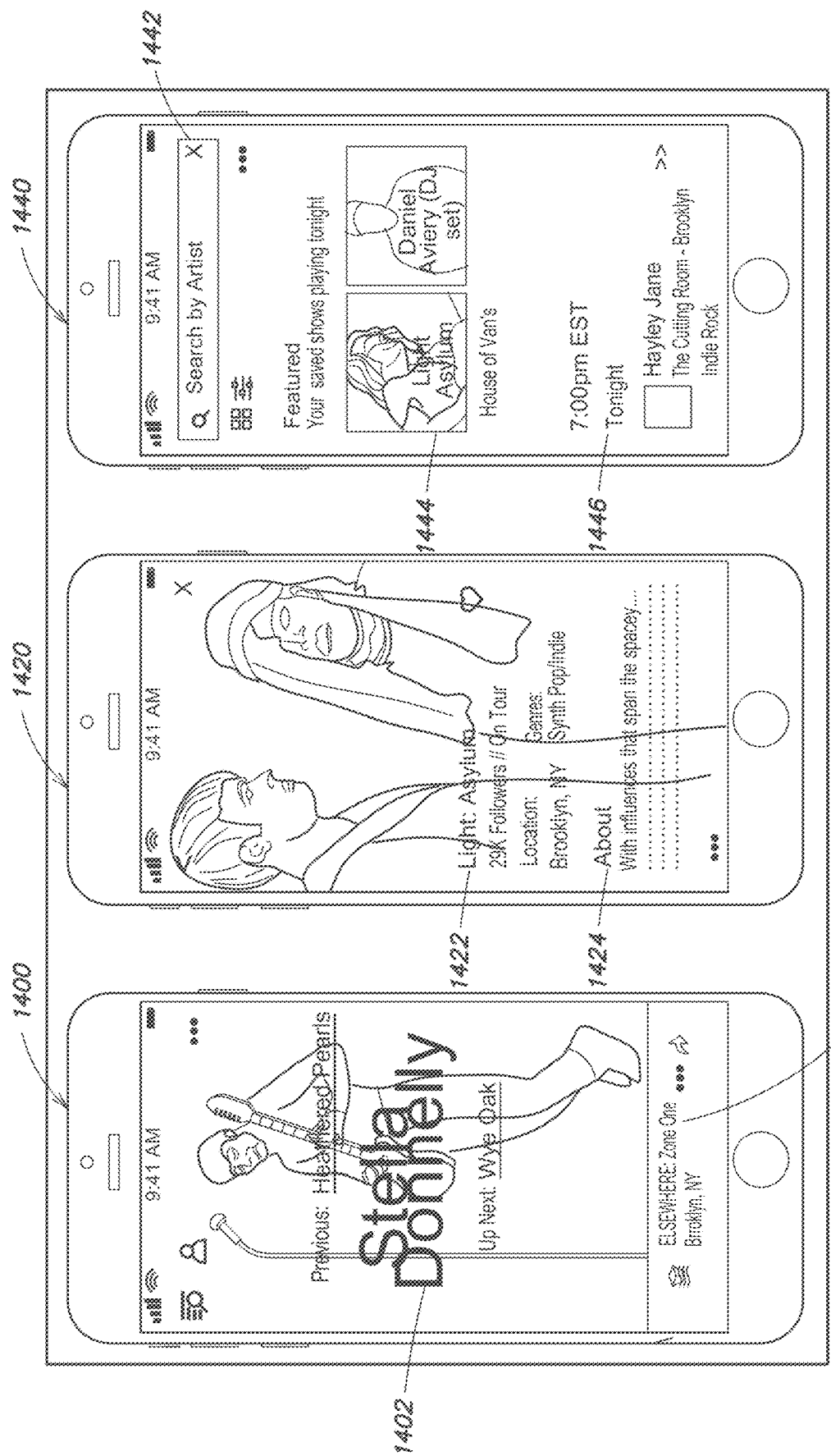
FIG. 14 shows exemplary interfaces for a software application for consuming real-time transmission of one or more events.

FIG. 14 shows exemplary interfaces 1400, 1420, and 1440 for a software application for consuming real-time transmission of one or more events. The software application (or app) may be implemented on a mobile device comprising a processor in communication with memory. The processor may be configured to execute instructions for the software application stored in memory.

In some embodiments, each screen in the app may represent a venue. The viewer may receive a real-transmission of an event by navigating to a screen for the venue where the event is being performed. The venue screen and/or the real-time transmission may be available in vertical and/or horizontal orientations per the preferences of the viewer. Additionally or alternatively, the viewer may stream the real-time transmission to a bigger screen, such as a television, using AIRPLAY, CHROMECAST, or another suitable protocol.

In some embodiments, the app benefits from automated capture of live video and/or audio feeds of one more events, from permanent or temporally installed cameras at the venues, and real time direction and/or editing of the feeds to generate the associated real-time transmission. For example, the viewer may switch between real-time transmissions from a venue in Brooklyn, a venue in Chicago, and another suitable venue. The viewer may receive an enhanced experience where he or she is not trapped in one venue and can experience different venues on his or her mobile device as desired. For example, interface 1400 shows options where the viewer may switch from the current performer 1402 to another performer 1404.

In some embodiments, the app allows for a viewer to contribute a monetary amount to support the performer via the app. The app may allow for the viewer to connect the performer's SPOTIFY page, read the performer's WIKIPEDIA page, or other suitable information feeds for the performer. For example, interface 1420 shows options where the viewer can read about the performer 1422 in an about section 1424. For example, interface 1440 shows options where the viewer may search for performers or events using search bar 1442, seek out featured and/or other recommended performers 1444, and obtain further information 1446 about when the related real-time transmission(s) will be streamed.

In some embodiments, the app may allow the viewer to view prior performances from the performer that were streamed in real time. In some embodiments, the app may allow for the viewer to control the direction of the video feeds. For example, the viewer may select that the drummer should always be within the frame, and the autodirection system may adapt the real-time transmission for the viewer to generate a real-time transmission where the drummer is always within the frame where feasible.

Example Computer Architecture

The hardware that the described systems and methods may reside on can vary based on certain factors. Because the system uses an observer-based architecture, there is flexibility around how many different metrics may be analyzed during a given performance. If cost dictates that less robust hardware be used, the number of metrics that can be analyzed simultaneously may be reduced. The more robust the hardware available, the greater the number of metrics and media streams that may be analyzed simultaneously.

Figure 15:
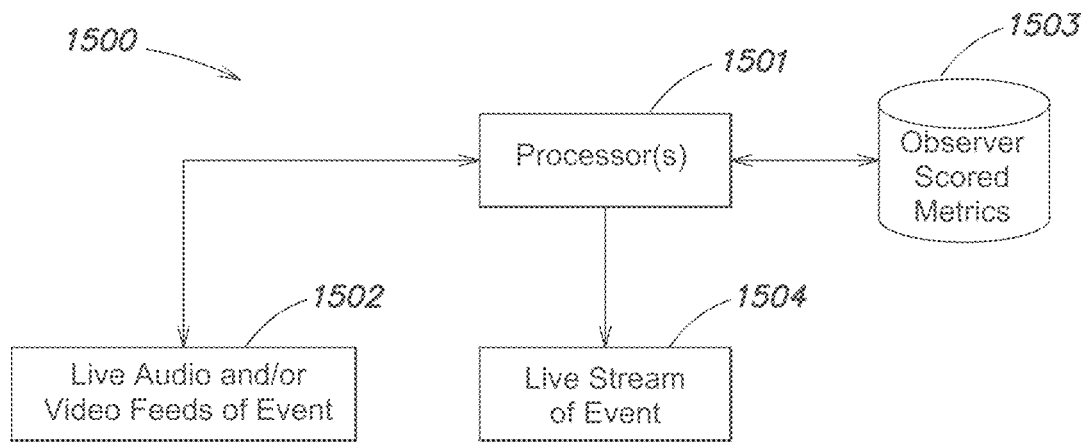
FIG. 15 shows an example implementation for an autodirection system in accordance with some embodiments of the technology described herein.

One example implementation of the described systems and methods is shown in FIG. 15. In particular, system 1500 may include one or more processors 1501 that are operable to generate a real-time transmission of an event (e.g., element 1504). Such information may be stored within memory or persisted to storage media. In some embodiments, processors 1501 may receive one or more live audio and/or video feeds 1502 received in real time from the event. In some embodiments, processors 1501 may receive and/or generate scored metrics 1503 for each live feed according to the described systems and methods. Processors 1501 may be configured to execute the described systems and methods to generate the real-time transmission of the event 1504 based on the one or more live audio and/or video feeds 1502 and the scored metrics 1503.

Figure 16:
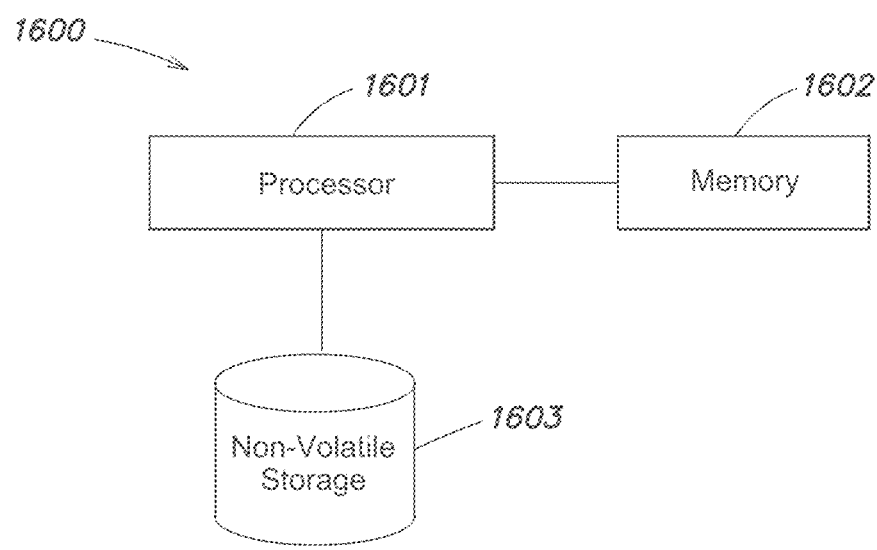
FIG. 16 shows an example computer system for executing an autodirection system in accordance with some embodiments of the technology described herein.

An illustrative implementation of a computing device 1600 that may be used in connection with any of the embodiments of the disclosure provided herein is shown in FIG. 16. The computing device 1600 may include one or more processors 1601 and one or more articles of manufacture that comprise non-transitory computer-readable storage media (e.g., memory 1602 and one or more non-volatile storage media 1603). The processor 1601 may control writing data to and reading data from the memory 1602 and the non-volatile storage device 1603 in any suitable manner. To perform any of the functionality described herein, the processor 1601 may execute one or more processor-executable instructions stored in one or more non-transitory computer-readable storage media (e.g., the memory 1603), which may serve as non-transitory computer-readable storage media storing processor-executable instructions for execution by the processor 1601.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to control over dictionary definitions, and/or ordinary meanings of the defined terms.

As referred to herein, the term "in response to" may refer to initiated as a result of or caused by. In a first example, a first action being performed in response to a second action may include interstitial steps between the first action and the second action. In a second example, a first action being performed in response to a second action may not include interstitial steps between the first action and the second action.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for processing a stream for real-time transmission, the system comprising a processor in communication with memory, the processor being configured to execute instructions for an autodirection component stored in memory that cause the processor to:
   receive a real-time stream for an artistic performance, wherein the real-time stream comprises a first portion and a second portion received subsequent to the first portion;
   detect at least two or more human persons in the first portion of the real-time stream;
   rank the detected at least two or more human persons in the first portion of the real-time stream;
   select, based on the ranking, a first subject from the detected at least two or more human persons;
   determine a first subject framing for the first portion of the real-time stream based on the selected first subject;
   determine that none of the human persons in the first subject framing of the real-time stream is speaking or singing;
   responsive to determining that none of the human persons in the first subject framing is speaking or singing, select one or more different human persons as a second subject based on one or more of:
   a proximity of the one or more different human persons to a center of each frame in the first portion of the real-time stream, and
   an activity being performed by the one or more different human persons;
   process the second portion of the real-time stream to select a portion of each frame in the second portion of the real-time stream according to a second subject framing, wherein the portion of each frame includes at least the second subject; and
   transmit the processed second portion of the real-time stream in real-time.

2. The system of claim 1, wherein the detected at least two or more human persons are ranked based on proximity to a camera that captures the real-time stream.

3. The system of claim 1, wherein the detected at least two or more human persons are ranked based on determining which human person is speaking or singing in the artistic performance in the second subject framing.

4. The system of claim 3, wherein the detected at least two or more human persons are ranked based on proximity to a center of each frame in the first portion of the real-time stream.

5. The system of claim 3, wherein determining the subject framing comprises determining which of the at least two or more of the human persons is speaking or singing in the second portion and selecting that human person as the only subject for the portion of each frame in the second subject framing.

6. The system of claim 1, wherein the real-time stream is captured from one or more cameras including a left camera, a right camera, and/or a center camera.

7. The system of claim 1, wherein a second real-time stream for the artistic performance is analyzed using one or more backup rules subsequent to detecting no human person in the second portion of the real-time stream.

8. The system of claim 1, wherein processing the second portion of the real-time stream further includes selecting a zoom level for selecting the portion of each frame of the first portion of the real-time stream.

9. The system of claim 1, wherein processing the second portion of the real-time stream further includes selecting a first zoom level for some frames of the second portion of the real-time stream and a second zoom level for remaining frames of the second portion of the real-time stream.

10. The system of claim 1, wherein the system determines a penalty based on a quality of the real-time stream; wherein the determined penalty causes the processor to detect a next subject framing.

11. The system of claim 10, wherein the quality of the real-time stream includes whether either the first or the second subject is trackable, whether either the first or the second subject is out of frame, and/or whether there is noise in detection of either the first or the second subject.

12. The system of claim 1, wherein a distance of either the first or the second subject from a camera capturing the real-time stream is determined based on a size of the head of either the first or the second subject.

13. The system of claim 1, wherein detecting at least two or more human persons in the real-time stream includes detecting at least two or more human bodies and/or one or more mandatory parts on each of at least the first subject and the second subject.

14. The system of claim 13, wherein detecting at least two or more human persons in the real-time stream includes detecting at least two or more human bodies and/or one or more mandatory parts on each of at least the first subject and the second subject; wherein the one or more mandatory parts include an eye, an elbow, and a shoulder.

15. The system of claim 1, wherein the portion of each frame is selected based on maintaining a minimum margin between the head of either the first subject in the first subject framing or second subject in the second subject framing and an edge of the portion of the associated frame.

16. The system of claim 1, wherein a second real-time stream from a different camera is selected based on a threshold time passing subsequent to an initial transmission of the processed stream.

17. The system of claim 1, wherein a second real-time stream from a different camera is selected based on an audio stream associated with the real-time transmission and the second real-time transmission.

18. The system of claim 17, wherein the second real-time stream is selected in response to presence of a bar, an amplitude intensity, and/or a singing phrase in the audio stream.

19. The system of claim 1, wherein the one or more different human persons is selected based on the activity being performed, and wherein the activity is playing a musical instrument, speaking, or singing.

20. A computer-implemented method for processing a stream for real-time transmission, the method comprising using a processor to perform the acts of:
  receiving a real-time stream for an artistic performance, wherein no information for the artistic performance is received prior to receiving the real-time stream;
  detecting one or more human persons in the real-time stream;
  ranking the detected one or more human persons in the real-time stream;
  selecting, based on the ranking, a subject from the detected one or more human persons;
  determining a subject framing for the real-time stream based on the selected subject;
processing, without using a buffer, the real-time stream to select a portion of each frame in the real-time stream according to the subject framing, wherein the portion of each frame includes at least the subject; and
  transmitting the processed stream in real-time.

21. The method of claim 20, wherein the ranking is based on a location of the human persons and/or an activity being performed by the human persons.

22. The method of claim 20, further comprising:
  determining a penalty based on a quality of the real-time stream; and
  based on the determined penalty, selecting a next subject framing.

23. The method of claim 20, wherein a second real-time stream from a different camera is selected based on a threshold time passing subsequent to an initial transmission of the real-time stream.

24. A method for processing a stream for real-time transmission, the method comprising:
  receiving a real-time stream for an artistic performance, wherein the real-time stream comprises a first portion and a second portion received subsequent to the first portion;
  detecting at least two or more human persons in the first portion of the real-time stream;
  ranking the detected at least two or more human persons in the first portion of the real-time stream;
  selecting, based on the ranking, a first subject from the detected at least two or more human persons;
  determining a first subject framing for the first portion of the real-time stream based on the selected first subject;
  determining that none of the human persons in the first subject framing of the real-time stream is speaking or singing;
  responsive to determining that none of the human persons in the first subject framing is speaking or singing, selecting one or more different human persons as a second subject based on one or more of:
  a proximity of the one or more different human persons to a center of each frame in the first portion of the real-time stream, and
  an activity being performed by the one or more different human persons;
  processing the second portion of the real-time stream to select a portion of each frame in the second portion of the real-time stream according to a second subject framing, wherein the portion of each frame includes at least the second subject; and
  transmitting the processed second portion of the real-time stream in real-time.

25. The method of claim 24, wherein the detected at least two or more human persons are ranked based on proximity to a camera that captures the real-time stream.

26. The method of claim 24, wherein the detected at least two or more human persons are ranked based on determining which human person is speaking or singing in the artistic performance in the second subject framing.

27. The method of claim 26, wherein the detected at least two or more human persons are ranked based on proximity to a center of each frame in the first portion of the real-time stream.

28. The method of claim 26, wherein determining the subject framing comprises determining which of the at least two or more of the human persons is speaking or singing in the second portion and selecting that human person as the only subject for the portion of each frame in the second subject framing.

29. The method of claim 24, further comprising:
  determining a penalty based on a quality of the real-time stream; and
  based on the determined penalty, selecting a next subject framing.

30. The method of claim 29, wherein the quality of the real-time stream includes whether either the first or the second subject is trackable, whether either the first or the second subject is out of frame, and/or whether there is noise in detection of either the first or the second subject.

31. The method of claim 24, wherein detecting at least two or more human persons in the real-time stream includes detecting at least two or more human bodies and/or one or more mandatory parts on each of at least the first subject and the second subject.

32. The method of claim 24, wherein a second real-time stream from a different camera is selected based on a threshold time passing subsequent to an initial transmission of the processed stream.

33. The method of claim 24, wherein a second real-time stream from a different camera is selected based on an audio stream associated with the real-time transmission and the second real-time transmission.

34. The method of claim 24, wherein the one or more different human persons is selected based on the activity being performed, and wherein the activity is playing a musical instrument, speaking, or singing.

35. A system for processing a stream for real-time transmission, the system comprising a processor in communication with memory, the processor being configured to execute instructions for an autodirection component stored in memory that cause the processor to:
  receive a real-time stream for an artistic performance, wherein no information for the artistic performance is received prior to receiving the real-time stream;
  detect one or more human persons in the real-time stream;
  rank the detected one or more human persons in the real-time stream;
  select, based on the ranking, a subject from the detected one or more human persons;
  determine a subject framing for the real-time stream based on the selected subject;
  process, without using a buffer, the real-time stream to select a portion of each frame in the real-time stream according to the subject framing, wherein the portion of each frame includes at least the subject; and
  transmit the processed stream in real-time.

36. The system of claim 35, wherein the ranking is based on a location of the human persons and/or an activity being performed by the human persons.

37. The system of claim 35, wherein the system determines a penalty based on a quality of the real-time stream; and wherein the determined penalty causes the processor to detect a next subject framing.

38. The system of claim 35, wherein a second real-time stream from a different camera is selected based on a threshold time passing subsequent to an initial transmission of the real-time stream.

* * * * *